(12) United States Patent
Kobayashi et al.

(10) Patent No.: US 6,722,695 B2
(45) Date of Patent: Apr. 20, 2004

(54) AIRBAG AND METHOD FOR MANUFACTURING THE AIRBAG

(75) Inventors: Hiroyuki Kobayashi, Aichi-ken (JP); Yuji Sato, Aichi-ken (JP); Kenji Mori, Aichi-ken (JP)

(73) Assignee: Toyoda Gosei, Co., Ltd., Aichi (JP)

( * ) Notice: Subject to any disclaimer, the term of this patent is extended or adjusted under 35 U.S.C. 154(b) by 81 days.

(21) Appl. No.: 10/105,228

(22) Filed: Mar. 26, 2002

(65) Prior Publication Data

US 2002/0140216 A1 Oct. 3, 2002

(30) Foreign Application Priority Data

Mar. 29, 2001 (JP) .................................. 2001-097327
Oct. 24, 2001 (JP) .................................. 2001-326365

(51) Int. Cl.$^7$ .............................................. B60R 21/28
(52) U.S. Cl. ..................................... 280/739; 280/743.1
(58) Field of Search ............................ 280/739, 743.1, 280/728.1

(56) References Cited

U.S. PATENT DOCUMENTS 5,219,179 A * 6/1993 Eyrainer et al. ............ 280/739
5,533,753 A * 7/1996 Abraham ................... 280/739
6,017,057 A * 1/2000 O'Docherty ................ 280/739

FOREIGN PATENT DOCUMENTS

| JP | 07156734 A | * | 6/1995 | ........... B60R/21/16 |
| JP | 08072648 A | * | 3/1996 | ........... B60R/21/16 |
| JP | 08188112 A | * | 7/1996 | ........... B60R/21/28 |
| JP | Pei 9-134 | | 3/1997 | |
| JP | 10076906 A | * | 3/1998 | ........... B60R/21/28 |

* cited by examiner

Primary Examiner—Peter C. English
(74) Attorney, Agent, or Firm—Posz & Bethards, PLC

(57) ABSTRACT

An airbag has a slit group arranged in a flexible peripheral wall. The slit group is formed by arranging a plurality of slits intermittently along one line. As an inflating gas flows into the airbag so that the internal pressure of the airbag rises, a portion designed to rupture between the slits ruptures to open a vent hole in the area of the slit group for discharging the inflating gas. At the peripheral edges of the individual slits of the peripheral wall, there are portions which are solidified after melting. In this airbag, the shape holdability is retained at the peripheral edges of the slits. Therefore, the effective area and the opening timing of the vent hole is uniform for every airbag.

14 Claims, 16 Drawing Sheets

AIRBAG AND METHOD FOR MANUFACTURING THE AIRBAG

The present application claims priority to Japanese patent application of Kobayashi et al, filed Mar. 29, 2001, No. 2001-097327, and Japanese patent application of Kobayashi et al, filed Oct. 24, 2001, No 2001-326365, the entirety of each is hereby incorporated into the present application by this reference.

BACKGROUND OF THE INVENTION

1. Field of the Invention

The present invention relates to an airbag for an airbag device and a method for manufacturing the airbag. The airbag device is mounted in the steering wheel of a vehicle or in the instrument panel in front of a passenger's seat.

2. Description of the Related Art

In the prior art, the airbag of the airbag device is provided with a vent hole for discharging an inflating gas from the airbag. This airbag is inflated to a predetermined shape by the inflating gas fed from an inflator. At this point, the inflating gas is then discharged through the vent hole from the airbag so that its internal pressure does not exceed a predetermined value.

The time for the airbag to expand to the predetermined shape is longer if the vent hole is opened from the beginning of expansion of the airbag. Therefore, the vent hole is preferably formed when the internal pressure of the airbag reaches a constant value or higher. This vent hole is formed, for example, by forming a group of slits in the peripheral wall of the airbag. This slit group is formed by arranging a plurality of slits intermittently along one line. In this slit group, portions which are designed to rupture between slits are ruptured to form the vent hole for discharging the inflating gas (as referred to Unexamined Published Japanese Utility Model Application No. 9-134).

In the airbag of the prior art, however, the peripheral wall itself is made of a woven fabric of a synthetic resin. Specifically, the woven fabric was formed by weaving warp and weft threads of a synthetic resin of polyester or polyamide. Moreover, the airbag has to be compactly arranged when it is mounted as the airbag device on a vehicle. Therefore, the airbag is folded and housed in the airbag holding apparatus.

If the airbag is folded in the condition with the slits being formed in the peripheral wall of the airbag, moreover, the warps and wefts around the slits may become frayed or shifted out of position. Among airbags, therefore, during the formation of the vent holes there may occur differences in the effective area of the vent holes or in the timing by which the vent holes open.

SUMMARY OF THE INVENTION

An object of the present invention is to solve the aforementioned problems. Specifically, the object of the invention is to provide an airbag for forming a vent hole by a rupturing portion designed to rupture and, more particularly, an airbag which can stabilize the effective area and the opening timing of the vent hole, and a method for manufacturing the airbag.

The above-specified object is achieved by an airbag of the present invention. An airbag of the invention comprises a peripheral wall, a slit group, a portion designed to rupture and a vent hole. The peripheral wall is flexible and has portions which can be melted and can be solidified. The slit group is arranged in the peripheral wall and includes a plurality of slits arranged intermittently along one line. The portion designed to rupture is arranged between the slits of the slit group. The vent hole is formed along the line of the slit group by the rupture of the portion designed to rupture. The vent hole when opened discharges inflating gas. Moreover, the airbag of the invention further comprises portions formed in the peripheral wall at the peripheral edges of the slits, these portions solidifying after being melted.

Even when the airbag of the invention is folded, the melt-solidified portions prevent the fray and dislocation of the warps and wefts of the woven fabric at the peripheral edges of the slits. Therefore, the length and the rupture strength of the portion designed to rupture between the slits can be kept constant for every airbag. As a result, the opening timing at the time of forming the vent hole can be stabilized for every airbag. Moreover, the arranging position of the end portions of the slit group can be clearly specified for every airbag. Therefore, the effective area of the vent hole can also be stabilized for every airbag.

In the airbag of the invention, therefore, the effective area and the opening timing of the vent hole to be formed by the rupture of the portion designed to rupture can be stabilized for every airbag.

If the melt-solidified portions are formed all over the slit peripheral edges, moreover, the shape holdability of the slits can be retained. Therefore, the inflating gas to leak from the narrow clearances within the slits in the course of expansion of the airbag can be controlled to be constant. As a result, the time period from the start to the end of expansion of the airbag can also be stabilized for every airbag.

In the airbag of the invention, for example, the peripheral wall includes a main body cloth and an applied cloth having the slit group arranged therein. The main body cloth has an arranging hole opened for exposing the slit group to a portion for forming the vent hole and in a smaller shape than the outer shape of the applied cloth. The applied cloth is integrated with the main body cloth, the slit group being visible from the arranging hole, by sewing its peripheral edge to the peripheral edge of the arranging hole.

In this airbag, tensile forces are countered by the sewn portions of the peripheral edges of the applied cloth, even if they act on the peripheral wall at the peripheral edges of the applied cloth at the expansion time. Before the internal pressure of the airbag reaches a predetermined value (that is, before the vent hole is properly opened), therefore, it is possible to prevent a premature rupture at the portion designed to rupture on the applied cloth. As a result, the timing for forming the vent hole can be more stabilized for every airbag.

In the airbag of the invention, moreover, the peripheral wall includes a main body cloth and an applied cloth. The applied cloth is arranged over the main body cloth at a portion for forming the vent hole, by sewing its peripheral edge. The slits are individually cut through the applied cloth and the main body cloth. Moreover, the melt-solidified portion is formed by melting and fusing the applied cloth and the main body cloth to each other and then solidifying.

In this airbag, too, around the portion for forming the vent hole, there is formed the sewn portion in which the peripheral edge of the applied cloth is sewn to the main body cloth. Like the aforementioned airbag, therefore, even if pulling tensile forces act on the peripheral wall at the peripheral edges of the applied cloth when the airbag expands, the tensile forces are countered by the sewn portions of the peripheral edges of the applied cloth. Before the internal pressure of the airbag reaches a predetermined value, therefore, it is possible to prevent a premature rupture at the portion designed to rupture. It is also possible to stabilize the opening timing of forming the vent hole. Moreover, at the melt-solidified portions around the slits the overlaid applied cloth and main body cloth have been melted, fused thickly, and solidified together. In other words, the melt-solidified portions are formed to retain the highest shape holdability. Therefore, even if strong tensile forces act on the sewn portions at the peripheral edges of the applied cloth, i.e. the vent hole forming portion, in the course of expansion of the airbag, the portion designed to rupture does not rupture easily. As a result, premature rupture before the internal pressure of the airbag reaches the predetermined value is prevented as much as possible. It is also possible to further stabilize the opening timing at the vent hole forming time for every airbag.

Moreover, the line of the slit group may be bent and arranged in the peripheral wall so that the vent hole may be opened with a flap portion. The hinge line of the flap portion is arranged at the straight line joining two ends of the slit group. Moreover, the flap portion is arranged at a portion which is surrounded by the hinge line and the slit group, so that the vent hole is formed when the flap portion is opened bending at the hinge line.

In this airbag, the area of the vent hole can be more uniform among all airbags than the airbag where the vent hole is formed by arranging the slits merely in a straight line. Here, the vent hole formed by the slit group having the slits arranged in one straight line opens with its peripheral edges opened perpendicularly. If the opening width fluctuates, moreover, the effective area will easily change.

Where there is to be a bend in the arrangement of the slit group, it is desired that a slit originates at the bending point and continues outward in the shape of radiation focusing on the bending point. With this construction, when the vent hole is formed, the tearing forces passing through the bending point are not easily propagated to the peripheral wall around the bending point. Therefore, it is possible to prevent the peripheral wall from rupturing more than necessary.

Moreover, The slits of the slit group may be so individually arranged in an H-shape, as viewed in a top plan, that the two flap portions may be opened to open one vent hole when the internal pressure of the airbag rises. The opening shape of the vent hole is a rectangle. With this slit group, the following actions and effects can be acquired, as compared with the case in which the individual slits are arranged in a C-letter shape in a top plan view so as to form the same opening shape with one flap portion.

Specifically, the length of the side edges of the flap portion adjoining the hinge lines can be made shorter for the vent hole with two flap portions than that with one flap portion. Therefore, it is possible to reduce the tearing inertial forces along the side edges at the rupture time (at the door opening time). It is also possible to prevent such tearing from elongating the rupture at the two ends of each hinge line. As a result, it is possible to improve the uniformity of the effective area.

Thus, where a plurality of slits are arranged in a straight line, it is desired that trifurcated slits opened in a T-shape or an inverted T-shape are arranged at the two ends of the series of slits and such that ends of the parts of the T-shape or inverted T-shape toward the ends of the above straight line are directed to each other.

In this construction, the two flap portions are opened when the portion designed to rupture between the slits rupture. The hinge lines of the individual flap portions are the straight lines joining the ends of the transverse openings in the trifurcated slits. The leading edges of the individual flap portions are arranged on the side of the longitudinal openings of the two trifurcated slits. Merely by rupturing the portion designed to rupture arranged in the straight line portion, therefore, the vent hole having a wide effective area and a rectangular shape can be easily formed.

Moreover, it is desired that the straight line portion is constructed with at least one straight slit arranged between the two trifurcated slits. With this construction, the effective area of the rectangular vent hole can be easily adjusted if the number or length of the straight slits is changed.

In case the slit group includes a portion having a plurality of slits arranged straight, moreover, it is desired that this portion is arranged such that the directions of the individual slits are those of tensile forces which act on this portion for forming the vent hole in the peripheral wall when the inflating gas flows in prior to the formation of the vent hole. That is, the arrangement of slits is parallel to the tensile forces at the initial stage of the expansion of the airbag.

With this construction, the tensile forces to act in the directions to tear the portion designed to rupture in the course of expansion of the airbag are not applied to the vent hole forming portions. As a result, the portion designed to rupture at the straight line of the slit group is prevented from prematurely rupturing at the initial stage of expansion of the airbag before the internal pressure of the airbag reaches a predetermined value.

In case the portion of the peripheral wall in which the slit group is arranged is made of a woven fabric which is formed by weaving molten solidifiable warps and wefts and in case the slit group has a straight line portion in which a plurality of slits are arranged straight, moreover, it is desired that the array directions of the individual slits in the straight line portion are bias directions to intersect both the directions of the warps and the wefts.

With this construction, the portion designed to rupture of the straight line portion can be prevented from unnecessarily rupturing at the initial stage of expansion of the airbag. Specifically, when the portion designed to rupture of the straight line portion ruptures, the tensile forces to act on the portion designed to rupture acts generally perpendicular to the direction of the individual slits of the straight line portion. However, the directions of the tensile forces are biased to both the directions of the warps and wefts constructing the portions of the peripheral wall having the slit group. In other words, the directions of the tensile forces are those in which the woven fabric composed of the warps and wefts are easily extended. Therefore, the woven fabric of the warps and wefts can be stretched to reduce the tensile forces acting on the straight line slit portion. As a result, the portion designed to rupture between the slits of the straight line portion can be prevented from unnecessarily rupturing at the initial stage of expansion of the airbag before the internal pressure of the airbag reaches a predetermined value.

In case the angle of intersection between the direction of the individual slits of the straight line portion and the direction of the warps or the wefts is 45 degrees, both the direction of the straight line portion and the direction perpendicular to the straight line (i.e., the acting directions for the tensile forces to rupture the portion designed to rupture) are right bias directions or positive bias directions (i.e., the directions to intersect the directions of the warps and wefts individually at 45 degrees), in which the woven fabric is most extendible. In the case of the intersection angle of 45 degrees, therefore, the tensile forces to act on the portion designed to rupture can be most reduced to prevent the unnecessary rupture of the portions designed to rupture at the initial stage of expansion of the airbag. Even if the array directions of the straight line portion are less than 45 degrees for the intersection angle with the warps or wefts of 10 degrees or more, however, the woven fabric of the warps and wefts is extendible. Therefore, the tensile forces to act on the straight line portion in directions substantially perpendicular to the straight line portion can be reduced to some extent. As a result, the intersection angle between the straight line portion and the warps or wefts may be 10 to 45 degrees.

In case the peripheral wall is formed for a steering wheel by sewing the outer peripheral edges of a circular open side base cloth and a circular passenger's side base cloth to each other and in case the open side base cloth has a gas inlet port opened at its center for introducing the inflating gas and portions for forming the two vent holes, moreover, it is desired that the straight line portion is constructed in the following manner. Specifically, the straight line portion is arranged at each of two transversely symmetric portions on the longitudinal center axis extending through the gas inlet port in the open side base cloth. Moreover, the two straight line portions are individually arranged such that the individual slits are in a radial direction from the gas inlet port on the open side base cloth and tilted up to 45 degrees from the center axis on the front side of the gas inlet port.

In this airbag, the vent holes are located on the front side away from the back side of the ring portion which is gripped by the driver. As a result, the inflating gas to be discharged from the vent holes can be prevented from touching the hands of the driver directly. Of course, the directions on the open side base cloth radiating from the gas inlet port are oriented along the directions for the tensile forces to act on the open side base cloth at the time of extending and expanding the airbag. If the directions of the straight line portion are arranged in these radial directions of the open side base cloth, therefore, the tensile forces to act in the directions to tear the portion designed to rupture act as little as possible on the vent hole forming portion in the course of expansion of the airbag.

In a method for manufacturing an airbag of the invention, the slits are individually formed while the peripheral edges of the slits are melted at the time of forming the individual slits. After the slits are formed, the molten peripheral edges are solidified to form the melt-solidified portions at the peripheral edges of the individual slits in the peripheral wall thereby to form the slit group. In this method, it is possible to form the slits and melt the slit peripheral edges simultaneously by using a heated cutter or a laser cutter. After this, the slit peripheral edges are air-cooled and solidified, and the melt-solidified portions are formed. Therefore, the slits and the melt-solidified portions can be easily formed with few manufacturing steps, resulting in lower cost of the airbag.

Moreover, the end portions of individual slits which are close to the portion designed to rupture may be made wider than the portion of the slits away from the ends. With this construction, the end portions of the individual slits adjacent to the portion designed to rupture are widened. Therefore, the visual observation of the portion designed to rupture is facilitated. As a result, the length of the portion designed to rupture can be efficiently confirmed.

DESCRIPTION OF THE PREFERRED EMBODIMENTS

Figure 1:
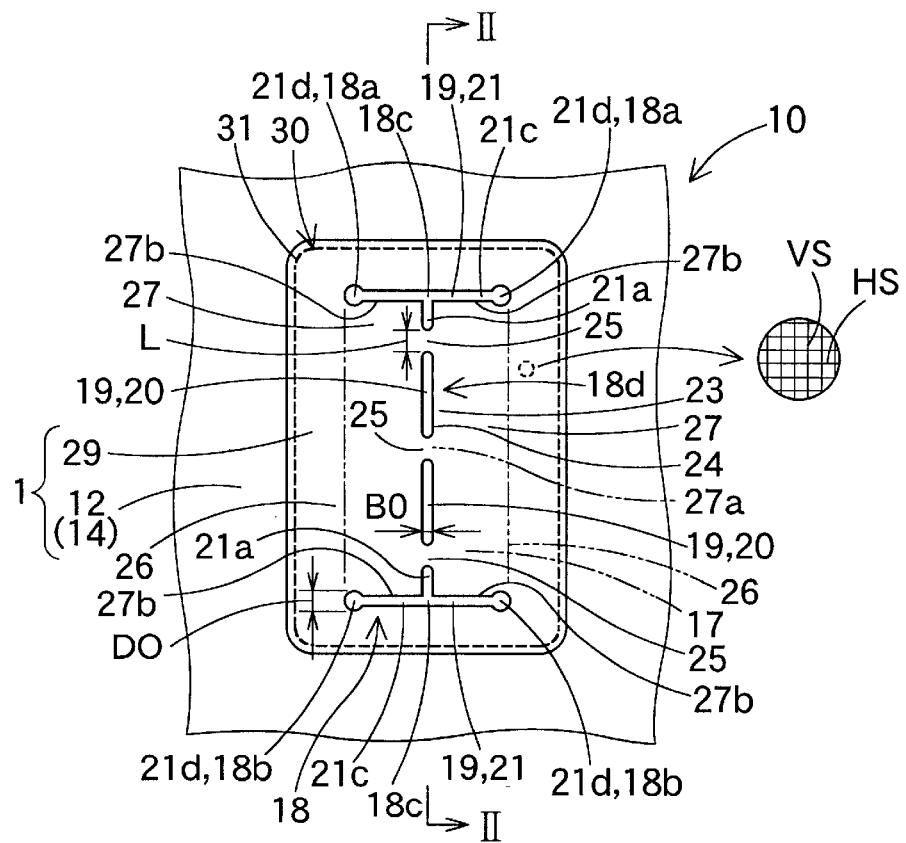
FIG. 1 is a bottom view of a vent hole formed portion of an airbag according to one embodiment of the present invention which is extended flat.

The invention will be described below by way of embodiments shown in the drawings. In addition, the invention is not limited to the embodiments. All modifications within the requirements of the claims and equivalents with respect to the requirements should be included in the scope of the claims.

Figure 3:
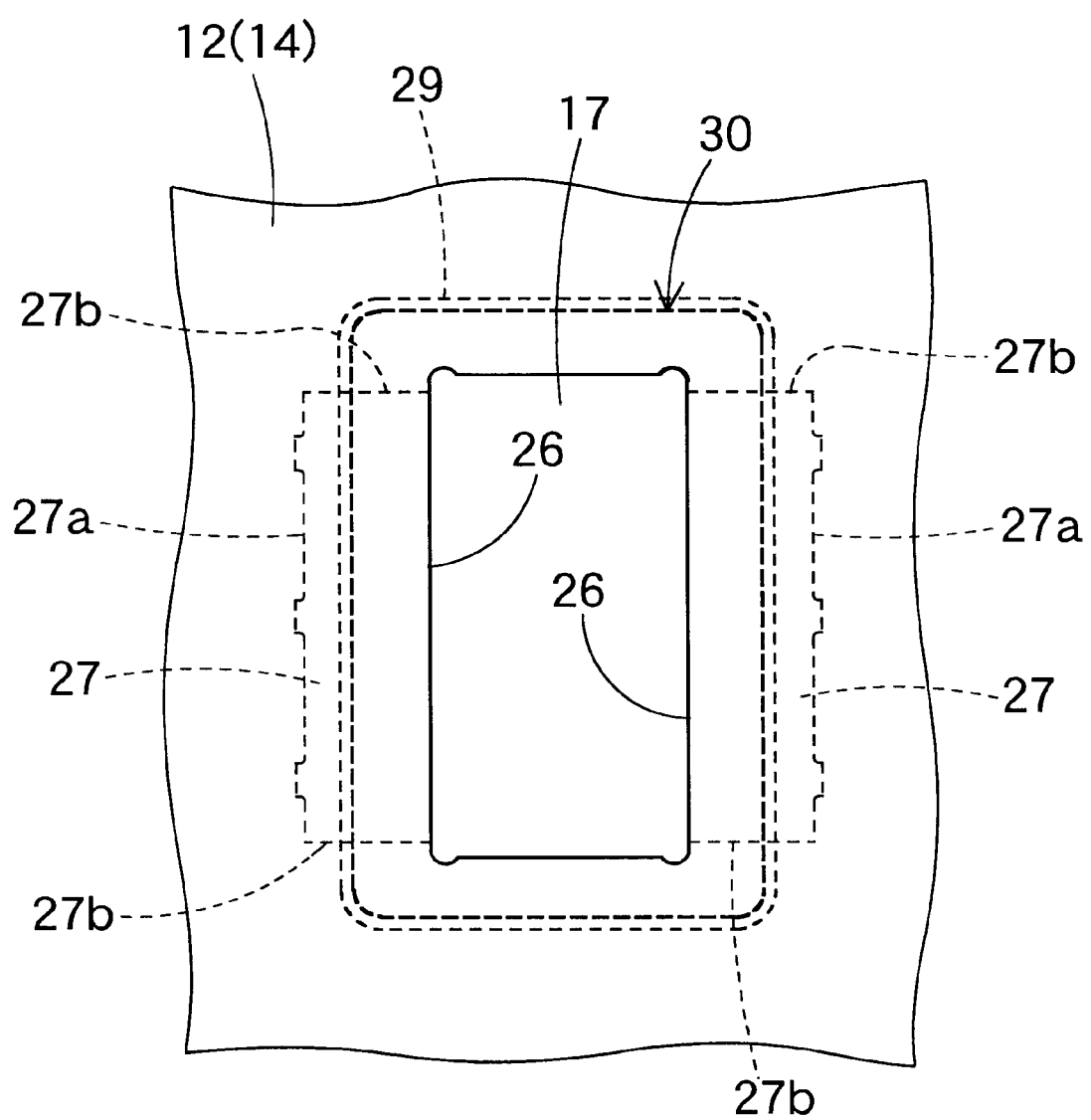
FIG. 3 is a view showing the state in which the vent hole of the embodiment is opened, from the inner side of the airbag.
Figure 4:
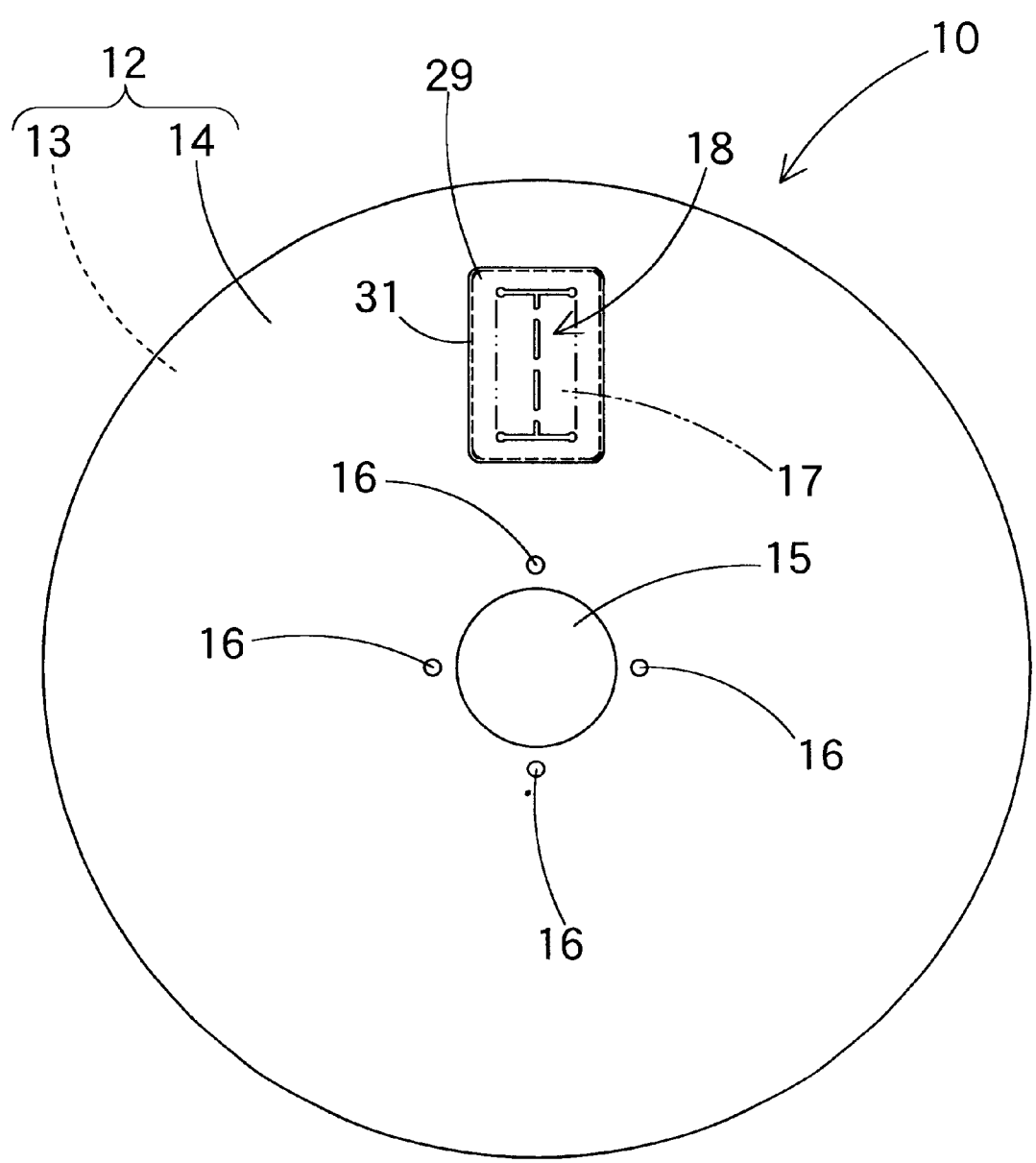
FIG. 4 is a bottom view of the airbag of the embodiment.
Figure 5:
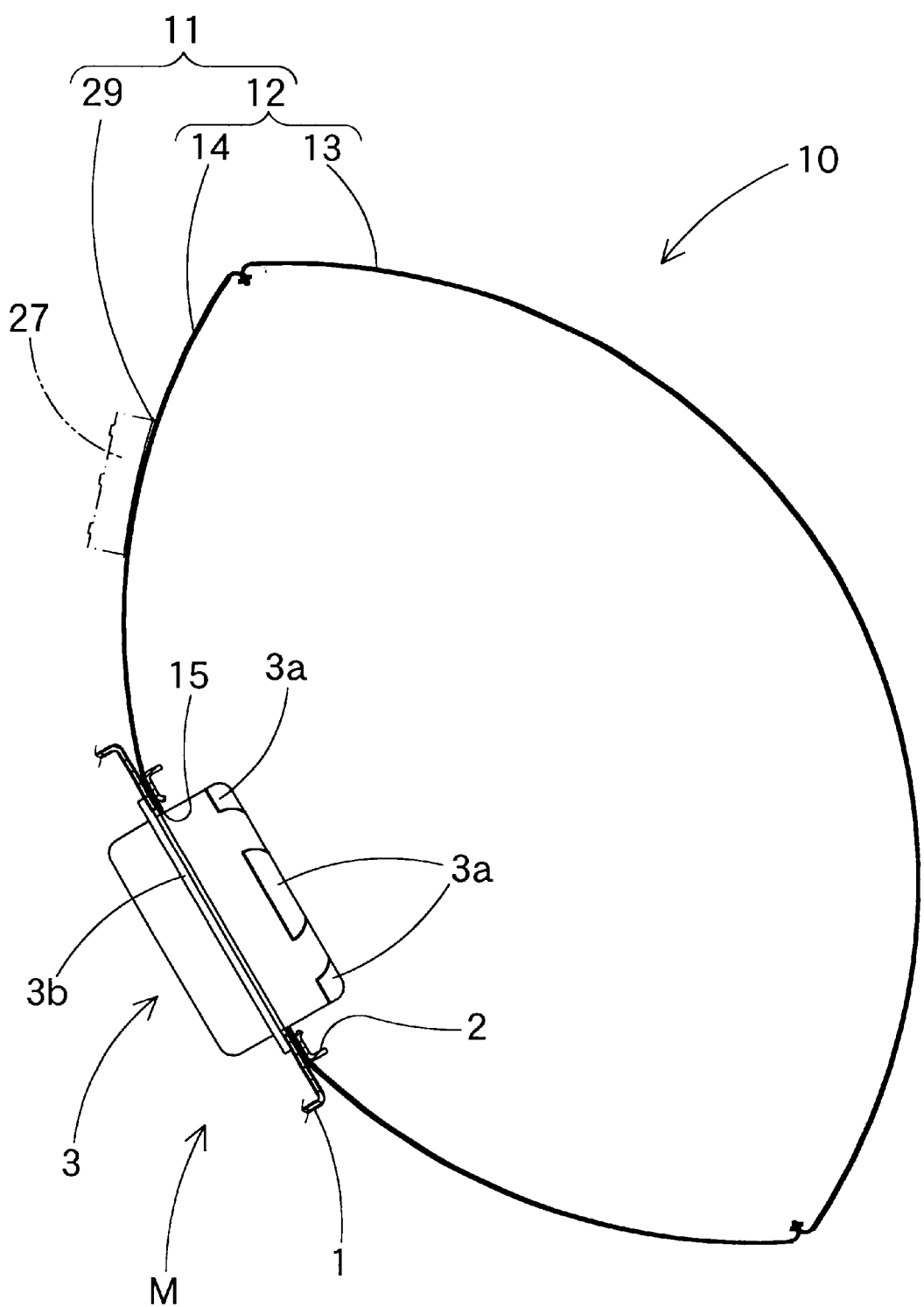
FIG. 5 is a schematic sectional view showing the state in which the airbag of the embodiment has completed its expansion after being activated.

An airbag 10 of an embodiment shown in FIGS. 1 to 5 is employed in a steering wheel airbag device M to be mounted in a steering wheel. The airbag 10 takes a generally spherical shape, as shown in FIG. 5, when its expansion is completed.

The airbag 10 is provided, as shown in FIGS. 4 and 5, with a gas inlet port 15 opened in a circular shape. The slit group 18 forms a vent hole 17.

The peripheral wall 11 is provided with a main body cloth 12 and an applied cloth 29. This applied cloth 29 is arranged in the portion of the main body cloth 12 for forming the vent hole 17. The main body cloth 12 is provided with a passenger's side base cloth 13 and an open side base cloth 14. These base cloths 13 and 14 are formed to take a circular disc shape when expanded. The main body cloth 12 is formed by sewing the outer circumference edges of the base cloths 13 and 14 to each other. The open side base cloth 14 has the gas inlet port 15 arranged at its center. Into the gas inlet port 15, there is inserted the end of an inflator 3 having a gas discharge ports 3a. The inflator supplies the gas for expansion in the airbag 10. Around the gas inlet port 15, there are formed a plurality of mounting holes 16. These mounting holes 16 are employed for attaching the airbag 10 to a bag holder 1.

The applied cloth 29 is formed into a larger rectangular shape than that of the slit group 18. The applied cloth 29 is sewn at its circumferential edge to the open side base cloth 14 of the main body cloth 12 by means of a sewing thread 31.

The passenger's side base cloth 13, the open side base cloth 14 and the applied cloth 29 are formed of a woven fabric having flexibility. This woven cloth is formed by plain-weaving multifilament yarns of a synthetic resin such as polyester or polyamide. Moreover, the woven cloth can be solidified where it is melted. The sewing thread 31 is made of a multifilament yarn of polyamide or the like.

Moreover, the slit group 18 is formed by arranging a plurality of slits 19 linearly, as shown in FIG. 1. In the case of the embodiment, the slits 19 are nonlinear and arranged in the shape of a transverse H-letter in a top plan view. This slit group 18 forms the vent hole 17 (as referred to FIG. 3) which is opened into the rectangular shape when two flap portions 27 and 27 are opened. These flap portions 27 and 27 are hinged at two lines 26 and 26 joining opposite ends 18a and 18b of the slit group 18. The flap portions 27 and 27 are individually arranged in the portions which are defined by the hinge lines 26 and 26 and the slit group 18. When the internal pressure of the airbag 10 rises, portions designed to rupture 25 between the slits 19 rupture. Then, the flap portions 27 and 27 are individually opened like a double-leafed hinge door on the hinge lines 26 and 26. As a result, the rectangular shaped vent hole 17 is opened.

In the case of the embodiment, moreover, the slit 19 is composed of two kinds of slits 20 and 21. The two slits 20 are straight as viewed in a top plan, and the slits 21 are T-shaped or inversely T-shaped as viewed in a top plan. The straight slits 20 and 20 are arranged in line at the leading end edges 27a of the flap portions 27 and 27. The leading end edges 27a are the turning edges when the individual flap portions 27 and 27 are opened. The trifurcated slits 21 and 21 are arranged on the side edges 27b of the individual flap portions 27 and 27 connected to the leading end edges 27a and to the hinge lines 26. Moreover, the end portions of one trifurcated slit 21 apart from the straight slits 20 and 20 are the ends 18a and 18a of the slit group 18. On the other hand, the end portions of the other trifurcated slit 21 apart from the straight slits 20 and 20 are the other ends 18b and 18b of the slit group 18. Moreover, line between ends 18a and 18b along the direction of the straight line slits 20 are the hinge lines 26 of the individual flap portions 27 and 27.

In the case of the embodiment, the three portions designed to rupture 25 are arranged between the slits 19 on the leading end edges 27a of the flap portions 27.

The slit end portions 18a and 18b are roughly circular openings with a larger internal diameter D0 than the width B0 of the slits 19 (20 and 21). With this construction, the end portions 18a and 18b are not ruptured at their circumferential edges when the flap portions 27 and 27 are opened.

Here, the width B0 of the slits 19 is desired within a range of 0.5 to 10 mm (e.g., 0.5 mm in the case of the embodiment). Below 0.5 mm, it is difficult to form the slits 19 with melt-solidified portions 24. Over 10 mm, a large amount of inflating gas leaks from the slits 19 before the vent hole 17 is opened. On the other hand, the internal diameter D0 of the end portions 18a and 18b is desired to be about one to two times as large as the slit width B0. Below one time, there arises a fear that the peripheral wall 11 may rupture in the peripheral edges of the end portions 18a and 18b. Over two times, a large amount of inflating gas leaks from the end portions 18a and 18b before the vent hole 17 is opened. In the case of the embodiment, the internal diameter D0 of the end portions 18a and 18b is set to 2 mm.

In the slit group 18 of the embodiment, moreover, the leading end edges 27a of the flap portions 27 and 27 are made longer, as shown in FIG. 4, than the side edges 27b of the individual flap portions 27 (i.e., than the total size of the side edges 27b of the two flap portions 27). Moreover, the leading end edges 27a are arranged in a direction of the open side base cloth 14 radiating from the gas inlet port 15. The radial direction of the open side base cloth 14 around the gas inlet port 15 is the direction of tensile forces which act on the open side base cloth 14 when the airbag 10 extends and expands. In the expanding of the airbag 10, the tensile forces to act in the directions which tear the portions designed to rupture 25 in the vent hole forming portion, are the least.

In the case of the embodiment, moreover, the leading end edges 27a and the side edges 27b of the flap portions 27 and 27 are set generally parallel or perpendicular to the warps VS and the wefts HS of the woven fabric of the main body cloth 12 and the applied cloth 29, as shown in FIG. 1.

Figure 2:
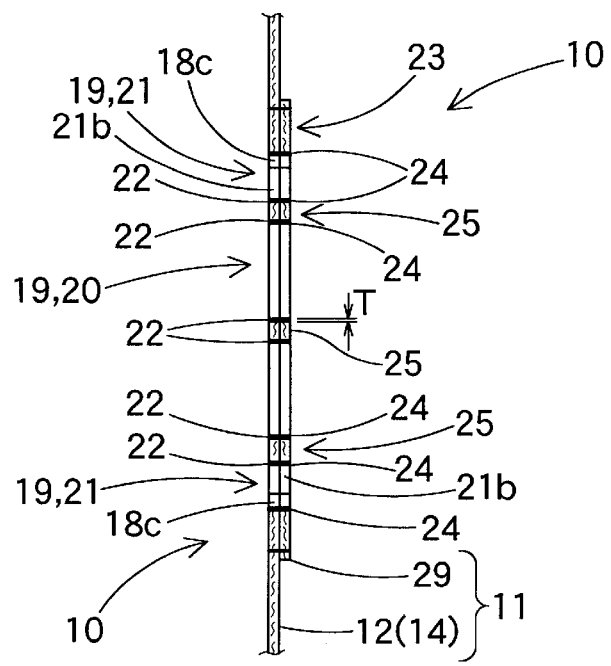
FIG. 2 is a sectional view taken along line II-II of FIG. 1.

Furthermore, the individual slits 19 (20 and 21) are arranged at the positions of the peripheral wall 11 in which the main body cloth 12 and the applied cloth 29 are overlaid, as shown in FIGS. 1 and 2. Moreover, the individual slits 19 extend from the front surface to the back of the peripheral wall 11. In the peripheral edges 23 of the individual slits in the peripheral wall 11, moreover, there are formed the portions 24 in which the applied cloth 29 and the main body cloth 12 are melted and solidified to each other. Here in the case of the embodiment, the melt-solidified portions 24 are formed all over the peripheral edges 23 of the slits 19.

Moreover, the length L and the thickness T are set by a trial-and-error method so that the portions designed to rupture 25 may rupture without fail when the airbag 10 reaches a predetermined internal pressure value. The length L is that of the portions designed to rupture 25 between the slits 19. The thickness T is that of the melt-solidified portions 24 along the slit peripheral edges 23. Here in the case of the embodiment, the length L of the portions designed to rupture 25 is set to 1.5 mm, and the thickness T of the melt-solidified portions 24 is set to 0.5 mm.

Figure 6A:
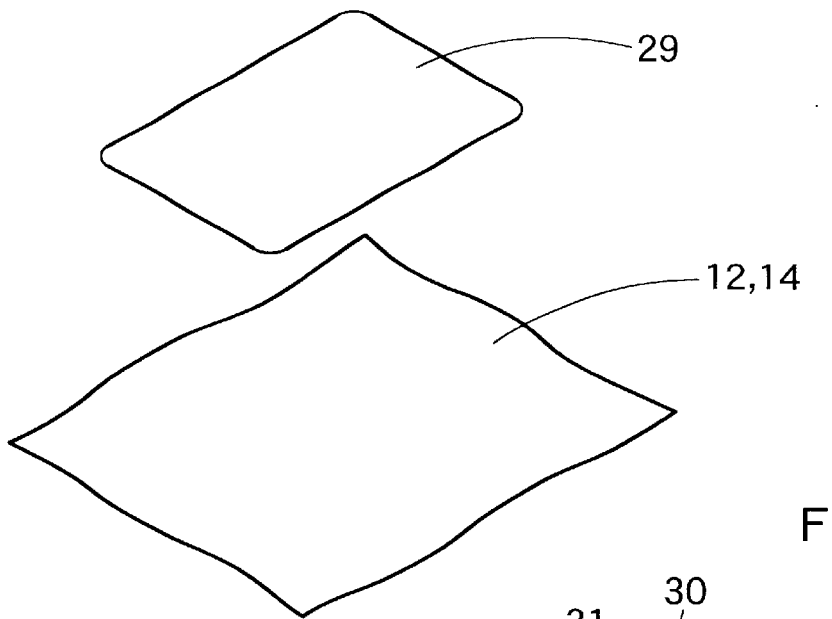
FIGS. 6A to 6C are view showing steps of manufacturing the vent hole of the embodiment.
Figure 6B:
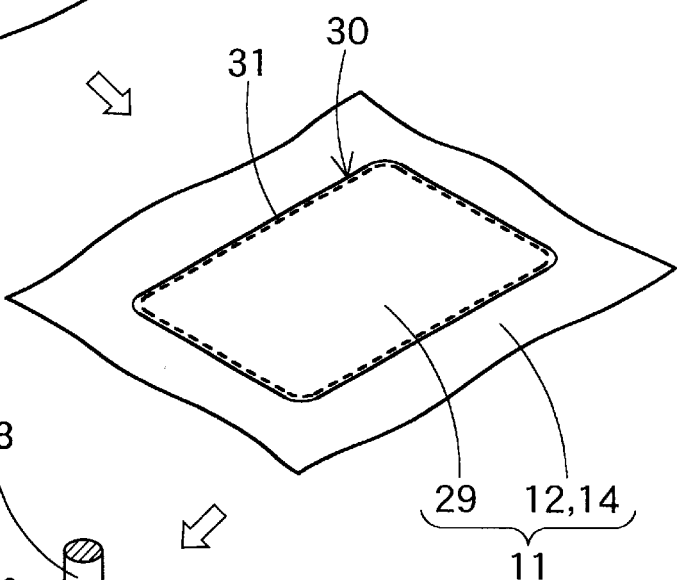
Figure 6C:
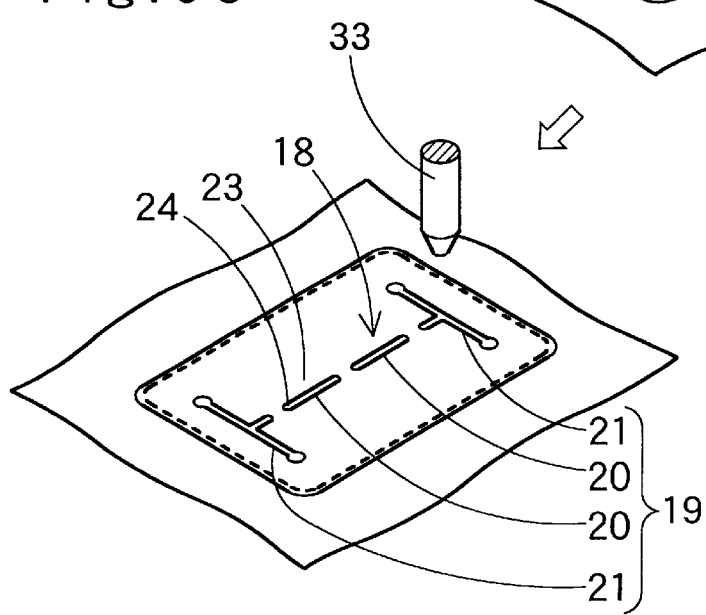

Here will be described the steps of manufacturing the airbag 10 of the embodiment. First of all, the applied cloth 29 is arranged at a predetermined position of the open side base cloth 14 of the main body cloth 12, as shown in FIGS. 6A and 6B. After this, the applied cloth 29 is sewn at its peripheral edges to the open side base cloth 14 by means of the sewing thread 31. Here, the open side base cloth 14 is already provided with the gas inlet port 15 and the mounting holes 16. As shown in FIG. 6C, moreover, a laser cutter 33 is employed to form the individual slits 19 (20 and 21) through the applied cloth 29 and the open side base cloth 14. At this time of the process of the embodiment, the peripheral edges 23 of the individual slits 19 are melted by the heat of the laser cutter 33 to form the individual slits 19. After this, the molten peripheral edges 23 are air-cooled and solidified.

Therefore, the melt-solidified portions 24 are formed all along the peripheral edges 23 of the individual slits 19.

After this, the passenger's side base cloth 13 and the open side base cloth 14 are connected with edges overlapping, and are sewn at their outer peripheral edges. Then, these base cloths can be turned inward using the gas inlet port 15 to manufacture the airbag 10.

At the time of assembling the airbag device M, moreover, an annular retainer 2 (refer to FIG. 5) is arranged initially on the peripheral edge of the gas inlet port 15 on the inner circumference side of the airbag 10. At this time, a plurality of not-shown bolts fixed in the retainer 2 are protruded through the individual mounting holes 16 of the airbag 10. Then, this airbag 10 is folded. This folding is done longitudinally and transversely. In the longitudinal folding, the airbag 10 first flattened with the passenger's side base cloth 13 and the open side base cloth 14 overlapping each other, and then is so longitudinally folded that its right and left edges come close to the gas inlet port 15. After longitudinally folding, the transverse width is about one third to a quarter of the diameter of the airbag 10 extended flat. Next, the airbag 10 is so transversely folded that its front and rear edges may come closer to the gas inlet port 15. After transversely folding, the longitudinal length is about one third or a quarter of that of the airbag 10 just longitudinally folded.

At this time of folding the airbag 10, the melt-solidified portions 24 are formed all over the peripheral edges 23 of the individual slits 19 in the peripheral wall 11. Even if tensile forces or compressive forces in various directions act on the peripheral wall 11, therefore, the melt-solidified portions 24 prevent the fray and dislocation of the warps VS and the wefts HS in the open side base cloth 14 and the applied cloth 29.

After the airbag 10 is folded, the not-shown bolts fixed in the retainer 2 are individually inserted into the not-shown mounting holes in the flange portion 3b of the inflator 3 and in the bag holder 1 (as referred to FIG. 5). Moreover, nuts are fastened on the inserted bolts to mount the airbag 10 and the inflator 3 on the bag holder 1. Moreover, the assembly of the airbag device M can be completed when the not-shown cover member for covering the folded airbag 10 is mounted on the bag holder 1.

Moreover, the airbag device M thus assembled is attached to a predetermined portion of the steering wheel by using the bag holder 1 so that it can be mounted in the steering wheel.

After mounted on a vehicle, the airbag 10 is abruptly inflated while rupturing the not-shown cover member, if the inflating gas is discharged from the gas discharge port 3a of the inflator 3. When the internal pressure of the airbag 10 exceeds a predetermined value, moreover, the portions designed to rupture 25 between the slits 19 rupture, as shown in FIGS. 1 and 3. Therefore, the flap portions 27 and 27 are turned and opened on the hinge lines 26 to open the vent hole 17 of rectangular shape. Then, the inflating gas is discharged from the vent hole 17 to suppress the rise in the internal pressure of the airbag 10.

At this time, in the airbag 10 of the embodiment, the melt-solidified portions 24 are formed at the peripheral edges 23 of the individual slits 19 (20 and 21) of the peripheral wall 11. Not only when the airbag 10 is folded up but also when the airbag device M is assembled or after the airbag device M is mounted on the vehicle, the melt-solidified portions 24 can prevent the fray and dislocation of the warps VS and the wefts HS of the woven fabric.

Therefore, the length and the rupture strength of the portions designed to rupture 25 between the slits 19 can be made constant for every airbag 10. Moreover, the timings of every airbag 10 for forming the vent holes 17 are not variable but are kept uniform. Moreover, the positions of the end portions 18a and 18b of the slit group 18 can be strictly determined for every airbag 10. Therefore, the effective areas of the vent holes of every airbag 10 are also not variable but are kept uniform.

In the embodiment, therefore, the effective areas and the opening timings at the time of forming the vent holes 10 can be stabilized for every airbag 10.

In the embodiment, moreover, the melt-solidified portions 24 are formed all along the slit peripheral edges 23 in the peripheral wall 11. In the course of expansion of the airbag 10, therefore, the inflating gas to leak from the narrow clearance of the slits 20 can be controlled to a constant value. As a result, the time period from the start to the completion of expansion of the airbag 10 is not variable but is kept uniform for every airbag 10.

If the aforementioned points may be disregarded, the melt-solidified portions 24 may be arranged exclusively at end portions where rupture begins 22 between the slits 19 or at the peripheral edges of the end portions 18a and 18b of the slit group 18. In this case as well, the airbag 10 of the embodiment can stabilize the effective areas and the opening timings for every airbag 10 at the time of forming the vent holes 17.

Moreover, the shape of the slit group 18 is not limited to that of the embodiment if the melt-solidified portions 24 are formed in the peripheral wall 11 either only at the rupture side end portions 22 between the slits 19 and at the peripheral edges of the end portions 18a and 18b of the slit group 18 or all over the peripheral edges 23 of the slits 19. The aforementioned effect can be acquired even from the C-shaped slit group 18A as in a peripheral wall 11A of FIG. 7, from a V-shaped or U-shaped slit group 18B as in a peripheral wall 11B of FIG. 8 or from a straight line slit group 18E as in peripheral wall 11E of FIG. 15, for example.

Figure 7:
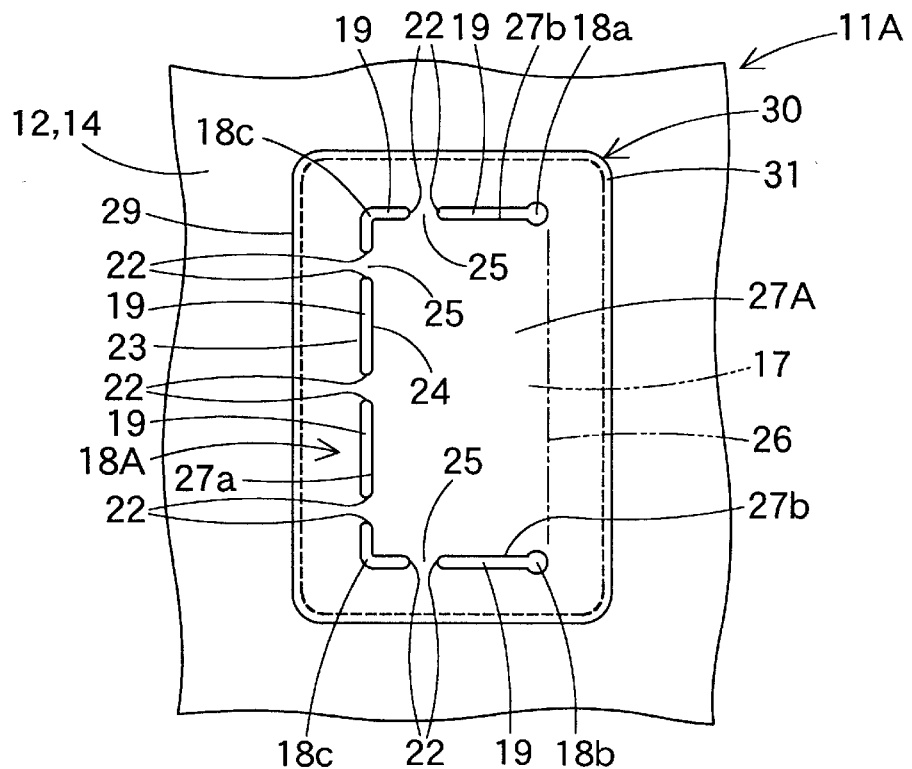
FIG. 7 is a view showing a portion for forming a vent hole of another embodiment.
Figure 8:
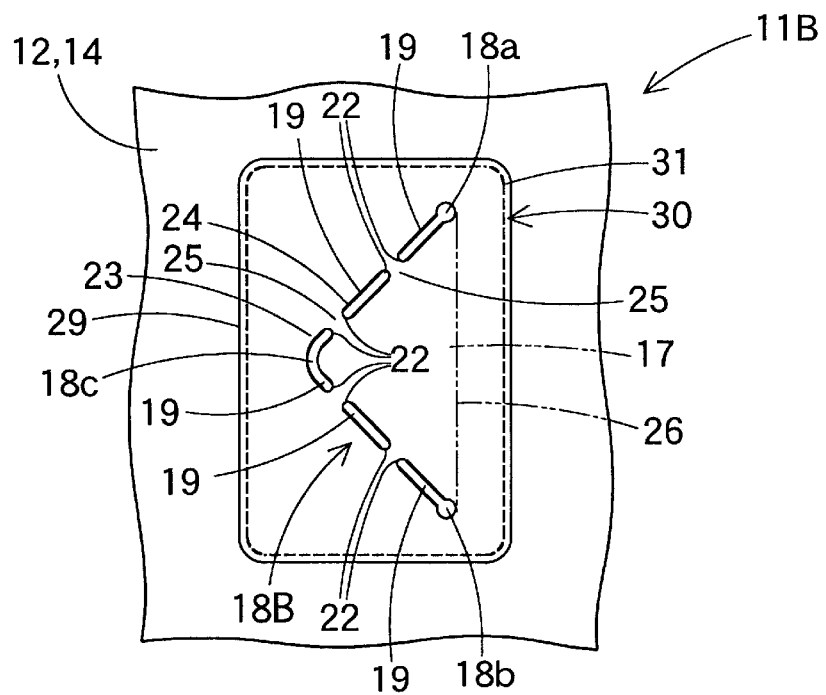
FIG. 8 is a view showing a portion for forming a vent hole of still another embodiment.
Figure 15:
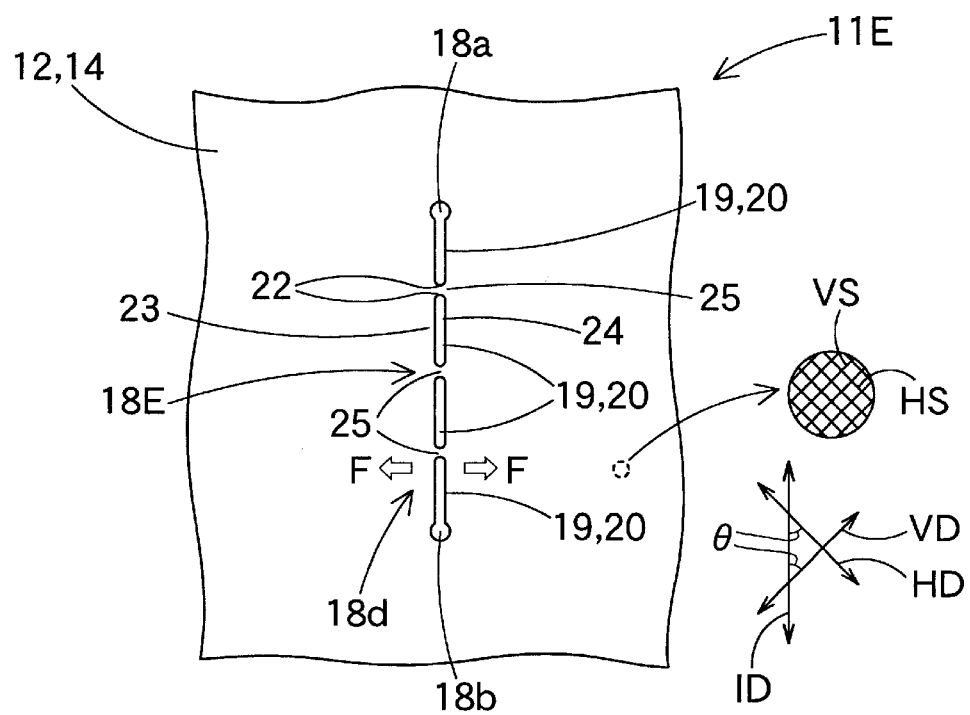
FIG. 15 is a view showing a portion for forming a vent hole of still a further embodiment.
Figure 16:
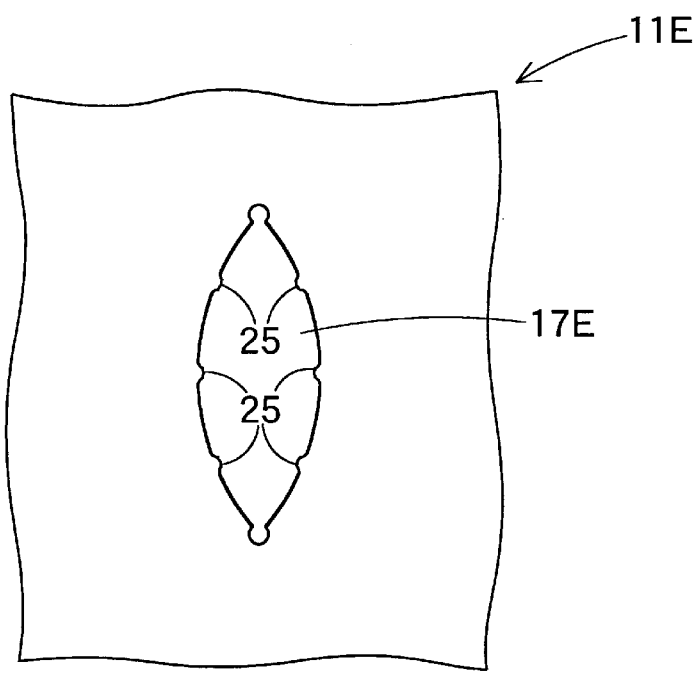
FIG. 16 is a view showing the state in which a vent hole is opened in the peripheral wall shown in FIG. 15.

Here in the peripheral walls 11A and 11B shown in FIGS. 7 and 8, the applied cloth 29 is sewn at its peripheral edge to the main body cloth 12. The slits 19 are formed through the two overlaid applied cloth 29 and main body cloth 12. Moreover, the applied cloth 29 and the main body cloth 12 are melted to form the melt-solidified portions 24. The peripheral wall 11E shown in FIGS. 15 and 16 is not provided with the applied cloth 29, but the slit group 18E is formed in the open side base cloth 14 itself.

In the airbag 10 of the embodiment, moreover, a sewn portion 30 is formed in the periphery of the portion for forming the vent hole 17 by sewing the peripheral edge of the applied cloth 29 to the main body cloth 12. Even if the tensile forces act on the peripheral edge of the applied cloth 29 in the peripheral wall 11 when the airbag 10 is inflated, therefore, it can be countered by the sewn portion 30 at the peripheral edge of the applied cloth 29. Specifically, it is possible to prevent an unnecessary rupture from occurring at the portions designed to rupture 25 between the slits 19 before the internal pressure of the airbag 10 reaches a predetermined value. As a result, it is possible to stabilize the opening timing for forming the vent hole 17.

Figure 9:
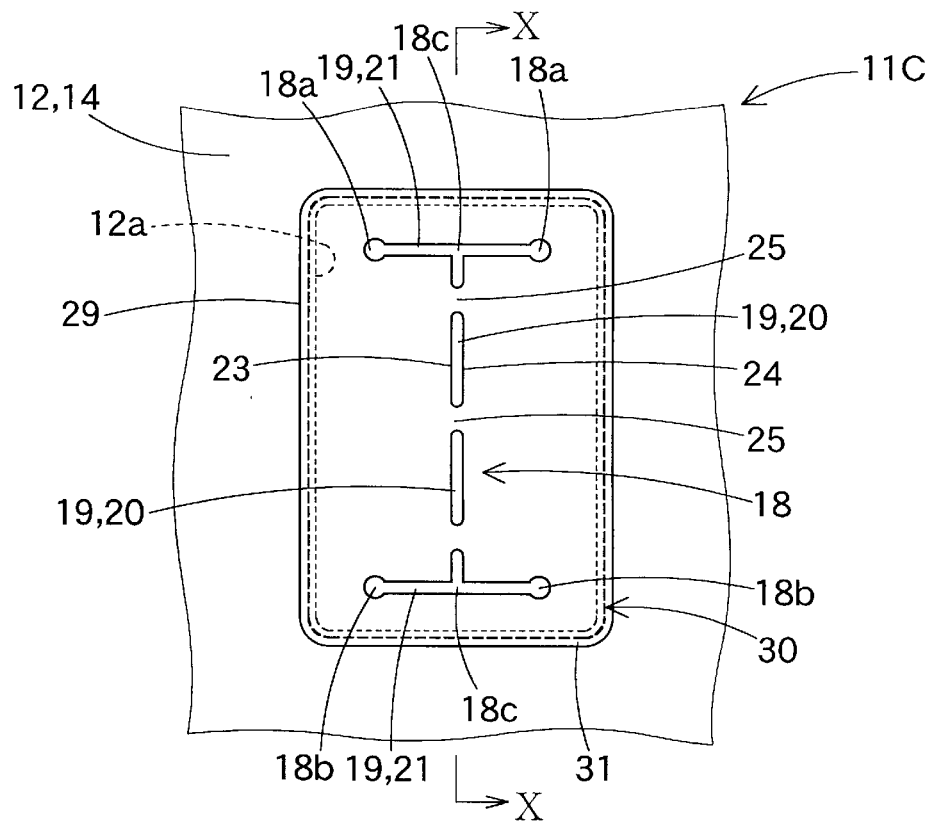
FIG. 9 is a view showing a portion for forming a vent hole of one more embodiment.
Figure 10:
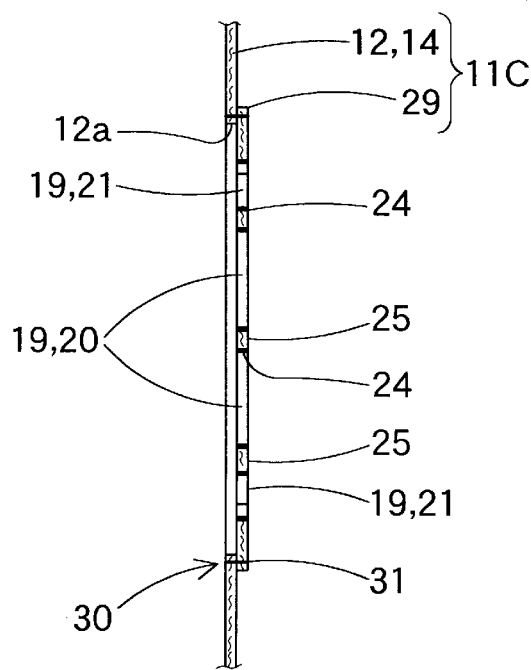
FIG. 10 is a sectional view taken along line X-X of FIG. 9.
Figure 11:
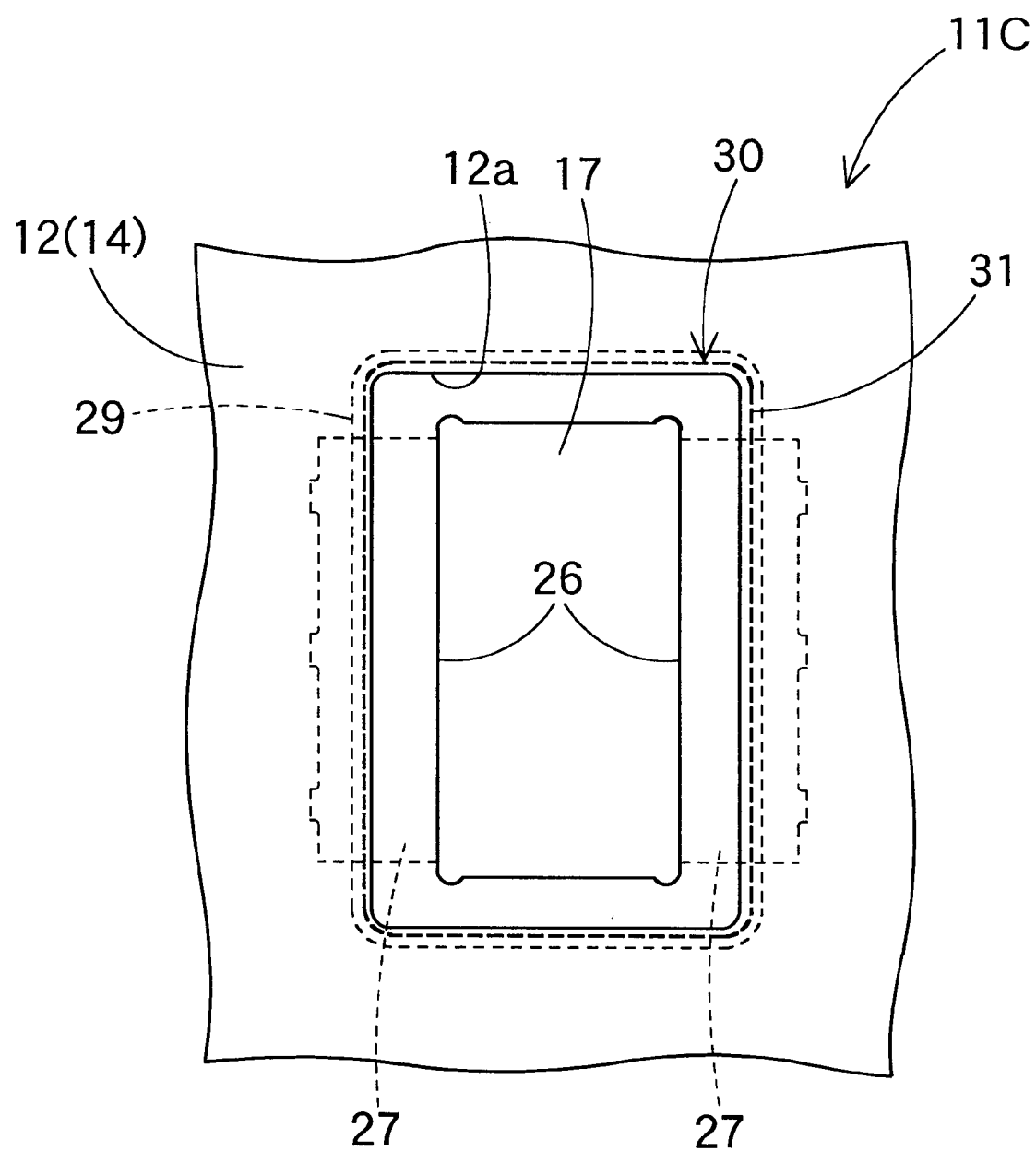
FIG. 11 is a view showing the state in which a vent hole is opened in the peripheral wall shown in FIG. 9.

Here in case the peripheral wall 11 is to be formed by sewing the applied cloth 29 to the main body cloth 12, it may be constructed like a peripheral wall 11C shown in FIGS. 9 to 11. Moreover, an arranging hole 12a is formed at the portion of the main body cloth 12 in the portion for forming the vent hole 17. The arranging hole 12a is arranged along a smaller outline than that of the contour of the applied cloth 29 so as to expose the slit group 18 to the outside. Moreover, the peripheral wall 11C is formed by sewing the peripheral edge of the applied cloth 29 to the peripheral edge of the arranging hole 12a to integrate the applied cloth 29 with the main body cloth 12. With this integration, the slit group 18 is visible from the arranging hole 12a.

In this case, too, the applied cloth 29 is sewn to the peripheral edge of the arranging hole 12a of the main body cloth 12. Even if the tensile forces act on the peripheral edge of the applied cloth 29 in the peripheral wall 11C at the time of inflating the airbag 10, therefore, it is countered by the sewn portion 30 of the peripheral edge of the applied cloth 29. In other words, premature rupture can be prevented from occurring at the portions designed to rupture 25 before the internal pressure of the airbag 10 reaches the predetermined value. As a result, the timing of forming the vent hole 17 can be stabilized for every airbag 10. In this peripheral wall 11C, the portions designed to rupture 25 are formed only in the applied cloth 29 but not in the main body cloth 12.

Figure 12:
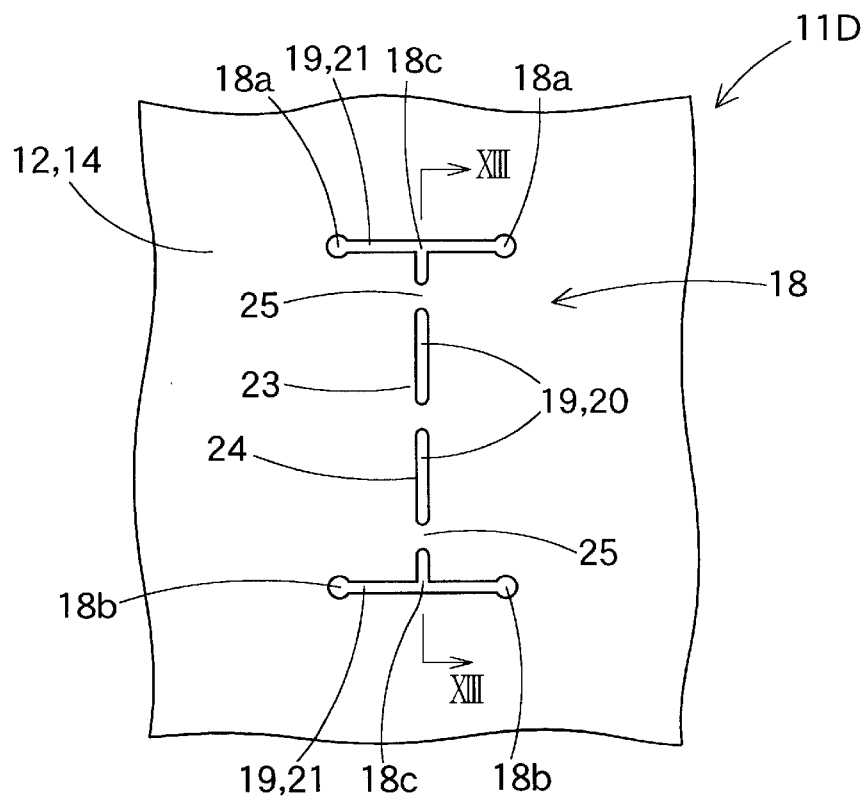
FIG. 12 is a view showing a portion for forming a vent hole of a further embodiment.
Figure 13:
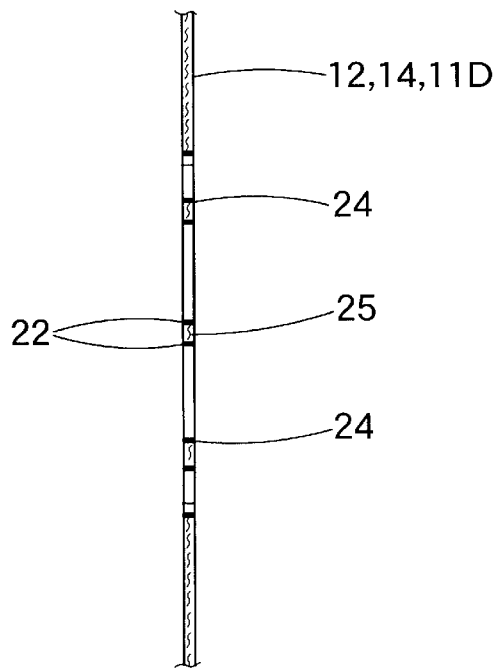
FIG. 13 is a sectional view taken along line XIII-XIII of FIG. 12.
Figure 14:
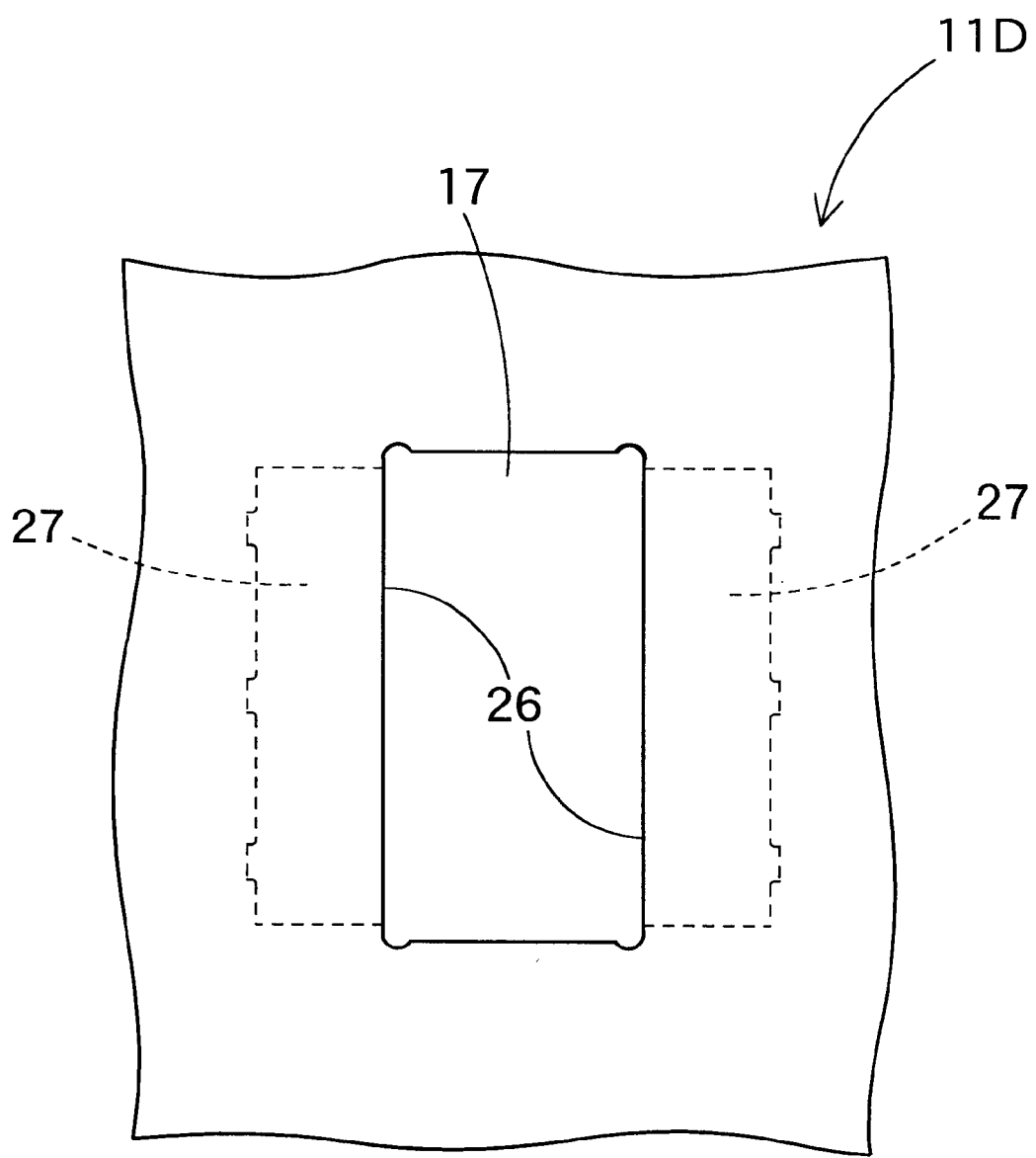
FIG. 14 is a view showing the state in which a vent hole is opened in the peripheral wall shown in FIG. 12.

If the aforementioned actions and effects may be disregarded, the melt-solidified portions 24 of the slit group 18 may naturally be arranged only at the open side base cloth 14 without using the applied cloth 29, as in a peripheral wall 11D shown in FIGS. 12 to 14 or in the peripheral wall 11E shown in FIGS. 15 and 16.

In the peripheral wall 11 of the airbag 10 of the embodiment, however, the slits 19 are formed in the main body cloth 12 and the applied cloth 29. Moreover, the melt-solidified portions 24 in the peripheries of the slits 19 are formed by melting and solidifying the thick overlaid applied cloth 29 and main body cloth 12. Therefore, the melt-solidified portions 24 of the peripheral wall 11 have the highest shape holdability. Even if strong tensile forces act inside the sewn portion 30 of the peripheral edge of the applied cloth 29, i.e., the portion for forming the vent hole 17, in the course of expansion of the airbag 10, the portions designed to rupture 25 between the slits 19 will not rupture easily. In other words, it is possible to prevent as much as possible the unnecessary rupture of the portions designed to rupture 25 before the internal pressure of the airbag 10 reaches the predetermined value. As a result, it is possible to further stabilize the timings by which the vent holes 17 of every airbag 10 are formed.

Here in case the melt-solidified portions 24 are formed integrally from the applied cloth 29 and the main body cloth 12, the applied cloth 29 should not be limited to one sheet but may be exemplified by two or more overlaid sheets.

In the airbag 10 of the embodiment, moreover, the slit group 18 is arranged in the H-shape, and the straight lines between the two ends 18a and 18b of the slit group 18 being the hinge lines 26. On the other hand, the portions defined by the hinge lines 26 and the slit group 18 provide the flap portions 27 and 27. Moreover, these flap portions 27 and 27 are opened on the hinge lines 26 to form one vent hole 17. As compared with a vent hole 17E shown in FIGS. 15 and 16, therefore, the effective areas of the vent holes 17 can be stabilized for every airbag 10. In the vent holes 17E shown in FIGS. 15 and 16, a slit group 18E is formed by arranging a plurality of linear slits 19 (straight slits 20) on a straight line. Moreover, the vent hole 17E shown in FIGS. 15 and 16 is opened by widening the gap between its peripheral edges in the widthwise direction. In this vent hole 17E, therefore, the effective area will easily change as the opening width fluctuates.

In case the flap portions 27 are to be formed by a nonlinear slit group 18, on the other hand, the slit group 18 may have a portion in the form of an arc curve. Moreover, the nonlinear split group is preferably formed by forming the slits 19 radially from a corner 18c (FIGS. 1, 7, 8, 9 and 12). This is because the tearing force to pass through the corner 18c at the time of forming the vent hole 17 does not readily propagate to the peripheral wall 11 (11A, 11B, 11C and 11D) around the corner 18c. Therefore, the peripheral edge of the corner 18c in the peripheral wall 11 does not readily rupture.

In case the flap portions 27 are formed by a nonlinear slit group 18, on the other hand, the peripheral wall 11D may be constructed as shown in FIGS. 12 and 13. This peripheral wall 11D is not provided with the applied cloth 29. This slit group 18 can also acquire the actions and effects similar to the aforementioned ones.

In the airbag 10 of the embodiment, moreover, each slit 19 of the slit group 18 is arranged in an H-shape, as viewed in a top plan. When the internal pressure of the airbag 10 rises, moreover, the two flap portions 27 and 27 are opened to open one rectangular vent hole 17. In the peripheral wall 11A shown in FIG. 7, on the other hand, the individual slits 19 of a slit group 18A are arranged in the C-shape, as viewed in a top plan. In this slit group 18A, the vent hole 17 of the same open shape as that of the slit group 18 is formed of one flap portion 27A. For the length of the side edges 27b touching the hinge line 26 of the flap portions 27 and 27, it can be made shorter than that of one flap portion 27A. Therefore, it is possible to reduce the tearing inertial force along the side edges 27b during the rupturing (the opening time of the flap portions 27). In the peripheral wall 11, therefore, a tear elongating the rupture in the vicinity of the two ends 18a and 18b of the hinge lines 26 can be prevented. As a result, the peripheral wall 11 can improve the uniformity of the effective area better than the peripheral wall 11A.

Here in case the individual slits 19 of the slit group 18 are arranged in the H-shape in the top plan view so that the two flap portions 27 and 27 are opened with internal pressure rise to form one rectangular vent hole 17, the applied cloth 29 need not be arranged in the peripheral wall 11D, as shown in FIGS. 12 and 13. This peripheral wall 11D can also acquire actions and effects similar to the aforementioned ones.

Especially in the airbag 10 in the embodiment, the slits 20 and 21 are arranged in the straight shape to provide a straight line portion 18d. At the two end portions of the straight line portion 18d, moreover, there are arranged the trifurcated slits 21 which have a T-shape or an inverted T-shape. Each of the two trifurcated slits 21 is provided with a longitudinal opening 21a and a transverse opening 21c to form the T-shape or the inverted T-shape (as referred to FIGS. 1 and 2). Moreover, the two trifurcated slits 21 are so arranged that the leading ends 21b of their longitudinal openings 21a are directed to each other. Here, the straight line portion 18d of the embodiment is composed of the two straight slits 20 and 20 and the longitudinal openings 21a and 21a of the two trifurcated slits 21. Moreover, the three portions designed to rupture 25 are arranged in the straight line portion 18d.

With this construction, the straight lines joining the leading ends 21d (or the end portions 18a and 18b) of the transverse openings 21c of the trifurcated slits 21 and 21 located at the two ends of the straight line portions 18d necessarily provide the hinge lines 26 and 26 individually, when the portions designed to rupture 25 of the straight line portion 18d rupture. Then, there open the two flap portions 27 and 27 which have their leading end edges 27a arranged on the side of the longitudinal openings 21a. Merely by rupturing the portions designed to rupture 25 arranged in the straight line portion 18d, therefore, the rectangular vent hole 17 having a wide effective area can be easily formed.

In the peripheral wall 11 of the embodiment, moreover, straight slits 20 are arranged between the two trifurcated slits 21 and 21. If the number or length of the straight slits 20 are altered, therefore, the effective area of the rectangular shape of the vent hole 17 can be easily adjusted.

Here in the peripheral wall 11 of the embodiment, the two straight slits 20 are formed in the straight line portion 18d. However, only one straight slit 20A need be formed in the straight line portion 18d as in the peripheral wall 11J of the airbag 10A shown in FIGS. 21 and 22. This construction is provided with the two portions designed to rupture 25. Of course, the straight line portion 18d need not have straight slits 20 at all. In this case, one portion designed to rupture is arranged, between the longitudinal openings 21a of the two trifurcated slits 21.

In the method for manufacturing the airbag 10 of the embodiment, the laser cutter 33 is employed at the time of forming the individual slits 19 to form the individual slits 19 (20 and 21) by melting the peripheral edges of the individual slits 19. After these slits 19 were formed, the molten peripheral edges 23 are solidified to form the melt-solidified portions 24 at the peripheral edges of the individual slits 19 in the peripheral wall 11 thereby to form the slit group 18. Simultaneously as the slits 19 are formed, therefore, the slit peripheral edges 23 are melted and are then air-cooled and solidified. Then, it is easy to form the slits 19 and the melt-solidified portions 24. Therefore, the airbag 10 can be manufactured while reducing the steps involved and the cost.

Here, it is desired that the slits 19 can be formed while being melted. Therefore, the slits 19 may be formed by employing a cutter such as the Thomson blade which is heated to melt the peripheral wall 11.

The peripheral wall 11E shown in FIGS. 15 and 16 is constructed of the woven fabric which has been made by weaving the warps VS and the wefts HS made of such a synthetic resin of polyester or polyamide as can be melted and solidified. Moreover, the slit group 18E formed in the peripheral wall 11E is provided with the straight line portion 18d which has the slits 20 arranged straight. In this peripheral wall 11E, the array direction ID of the individual slits 20 in the straight line portion 18d is set in a bias direction to intersect both the directions VD and HD of the warps VS and the wefts HS. In the peripheral wall 11E shown in FIGS. 15 and 16, the direction ID of the individual slits 20 intersects the individual directions VD and HD of the yarns VS and HS at an angle θ of intersection of about 45 degrees. Here, the direction ID of the individual slits 20 extends along the open side base cloth 14 radially from the (not-shown) gas inlet port 15.

With this construction, the portions designed to rupture 25 between the slits 20 and 20 can be prevented from unnecessarily rupturing at the initial stage of expansion of the airbag 10. Specifically, the tensile forces F to act on the portions designed to rupture 25 when the portions designed to rupture 25 of the straight line portion 18d rupture act individually in directions perpendicular to the array direction ID of the individual slits 20. However, the acting directions of the tensile forces F individually intersect the yarn directions VD and HD of the warps VS and the wefts HS constructing that portion of the peripheral wall 11E which forms the slit group 18E. In short, the acting directions of the tensile forces F are the bias directions of the woven fabric. And, the woven fabric composed of the warps VS and the wefts HS is liable to extend in the bias directions. Here, the elongations in the directions intersecting the yarn directions VD and HD at 45 degrees are two or three times as large as that of the elongations of the case of tensing in the yarn directions VD and HD. Therefore, the woven fabric composed of the warps VS and the wefts HS can be extended, reducing the tensile forces F acting on the straight line portion 18d. As a result, the individual portions designed to rupture 25 can be prevented from prematurely rupturing at the initial stage of expansion of the airbag 10 before the internal pressure reaches the predetermined value.

This construction, in which the array direction ID of the individual slits 20 of the straight line portion 18d is arranged in the bias directions to intersect the individual yarn directions VD and HD of the warps VS and the wefts HS, should not be limited to the straight line slit group 18, if it is provided with the straight line portion 18d. For example, the construction may be applied to the H-shaped, C-shaped, V-shaped or U-shaped slit group 18, 18B as shown in FIGS. 17 to 20. In short, the straight line portion may be constructed by arranging multiple slits linearly. Of course a straight line portion may also be formed in the main body cloth 12 or the applied cloth 29 making the peripheral wall.

Figure 17:
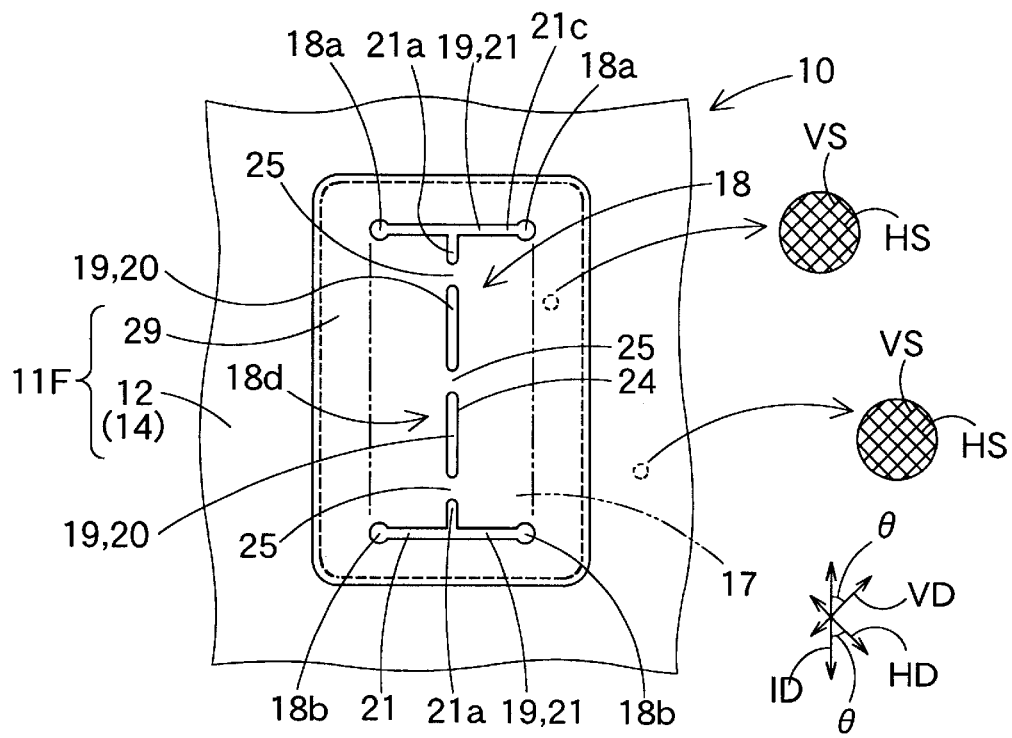
FIG. 17 is a view showing another peripheral wall.

Moreover, a peripheral wall 11F shown in FIG. 17 is similar to the peripheral wall 11 of the embodiment. However, the direction ID of the straight line portion 18d, in which the straight slits 20 and 20 are arranged in series, takes the intersection angle θ of about 45 degrees with respect to the directions VD and HD of the individual yarns VS and HS. In other words, the direction ID of the straight line portion intersects the directions VD and HD of the individual yarns VS and HS of the main body cloth 12 and the applied cloth 29. Here, the straight line portion 18d of the peripheral wall 11F is formed of the longitudinal openings 21a of the two trifurcated slits 21 and the two straight slits 20.

Figure 18:
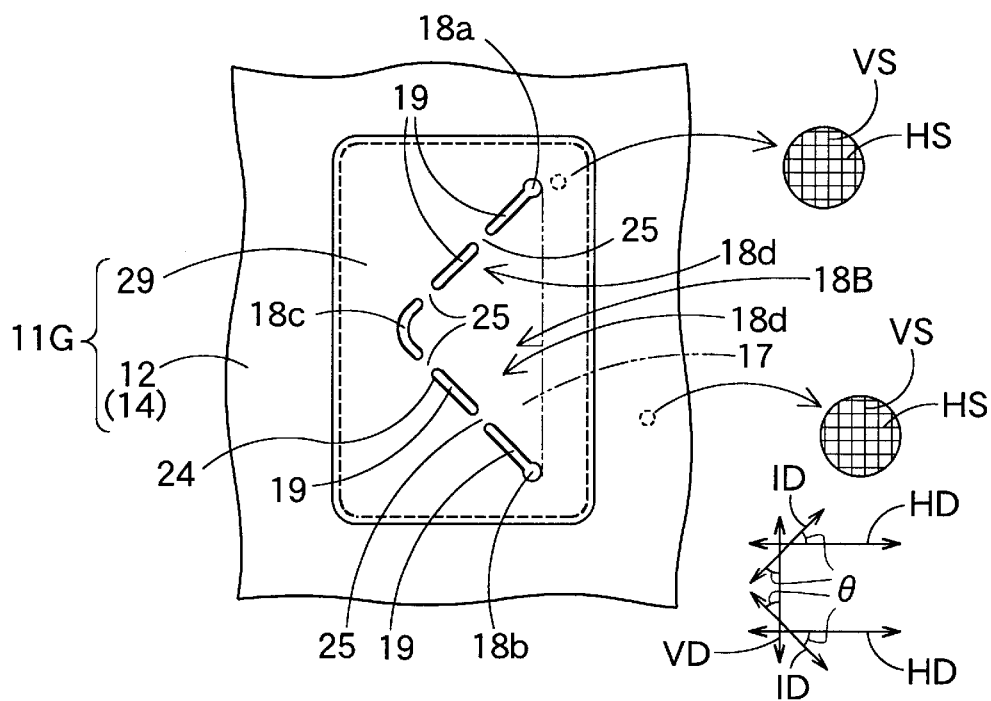
FIG. 18 is a view showing still another peripheral wall.

A peripheral wall 11G shown in FIG. 18 is similar to the peripheral wall 11B shown in FIG. 8. However, the direction ID of the individual slits 19 of the two series 18d and 18d has the intersection angle θ set to about 45 degrees with respect to the directions VD and HD of the individual yarns VS and HS. In other words, the direction ID intersects the directions VD and HD of the individual yarns VS and HS of the main body cloth 12 and the applied cloth 29. Here, the two straight line portions 18d of the peripheral wall 11G are individually arranged at positions extending from the end portions 18a and 18b to the bending point 18c.

Figure 19:
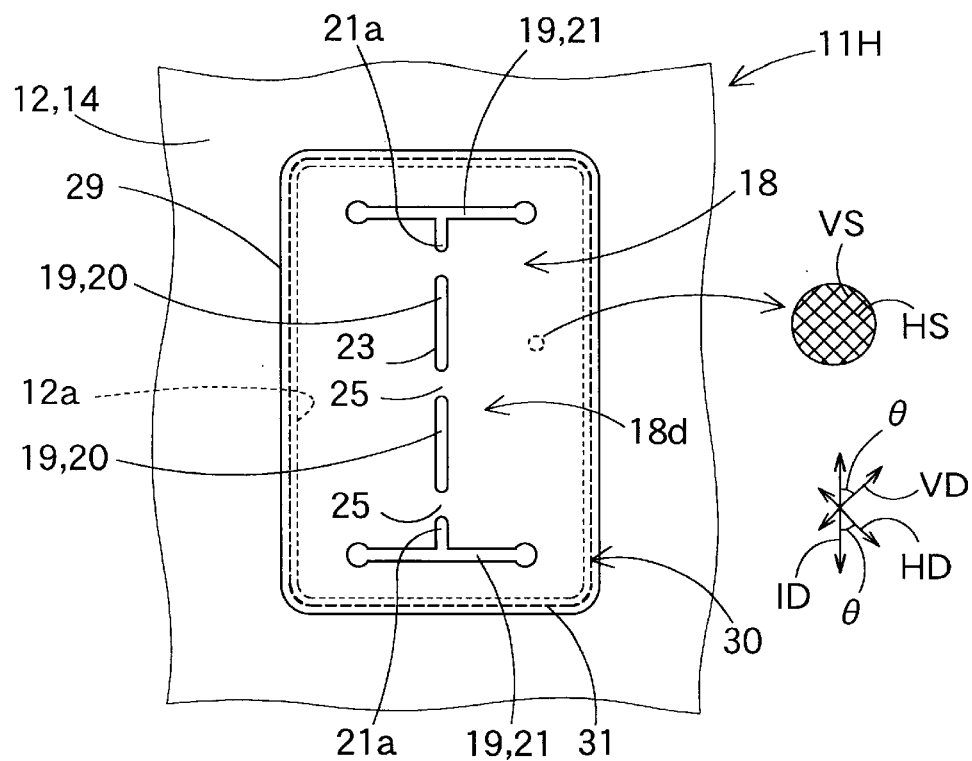
FIG. 19 is a view showing still another peripheral wall.

A peripheral wall 11H shown in FIG. 19 is similar to the peripheral wall 11C shown in FIG. 9. However, the direction ID of the straight line portion 18d has the intersection angle θ of about 45 degrees with respect to the directions VD and HD of the individual yarns VS and HS. In other words, the direction ID intersects the directions VD and HD of the individual yarns VS and HS of the applied cloth 29.

Figure 20:
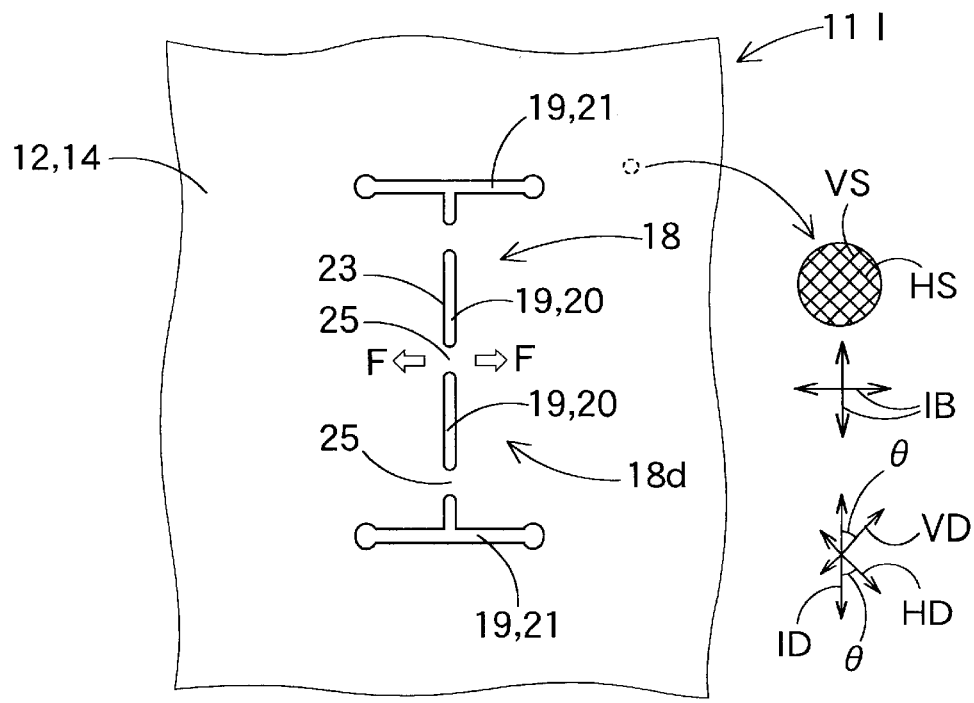
FIG. 20 is a view showing still another peripheral wall.

A peripheral wall 11I shown in FIG. 20 is similar to the peripheral wall 11D shown in FIG. 12. However, the array direction ID of the straight line portion 18d intersects the directions VD and HD of the individual yarns VS and HS of the open side base cloth 14 at the intersection angle θ of 45 degrees.

Here, with respect to the peripheral walls 11F and 11G shown in FIGS. 17 and 18, the directions VD and HD of the yarns VS and HS in the main body cloth 12 and the applied cloth 29 are made different from each other. Moreover, the direction ID of the slits 20 and 21 of the straight line portion 18d need only be set in a bias direction with reference to the yarn directions VD and HD of either the main body cloth 12 and the applied cloth 29, not both.

Figure 21:
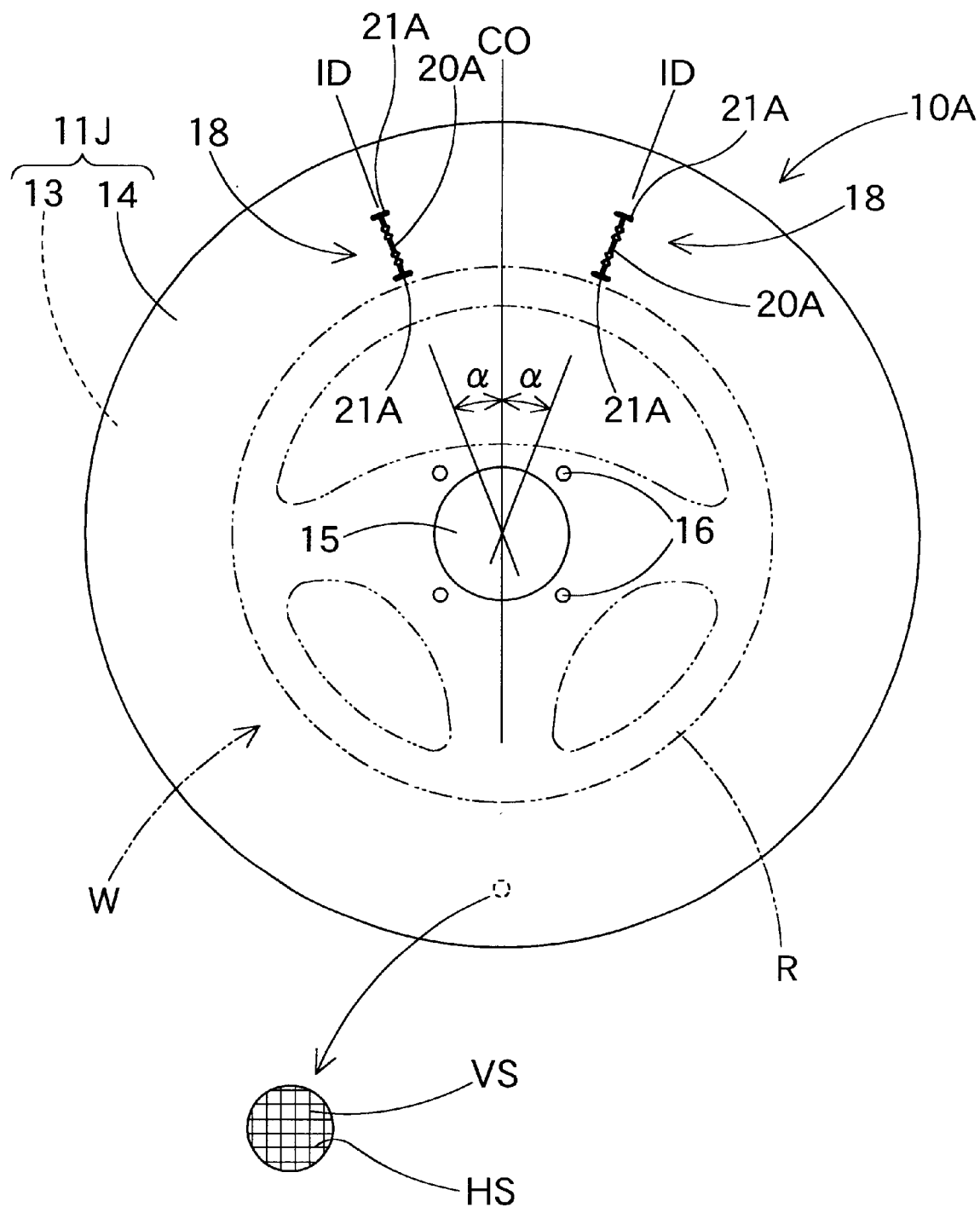
FIG. 21 is a bottom view of an airbag of a further embodiment.
Figure 22:
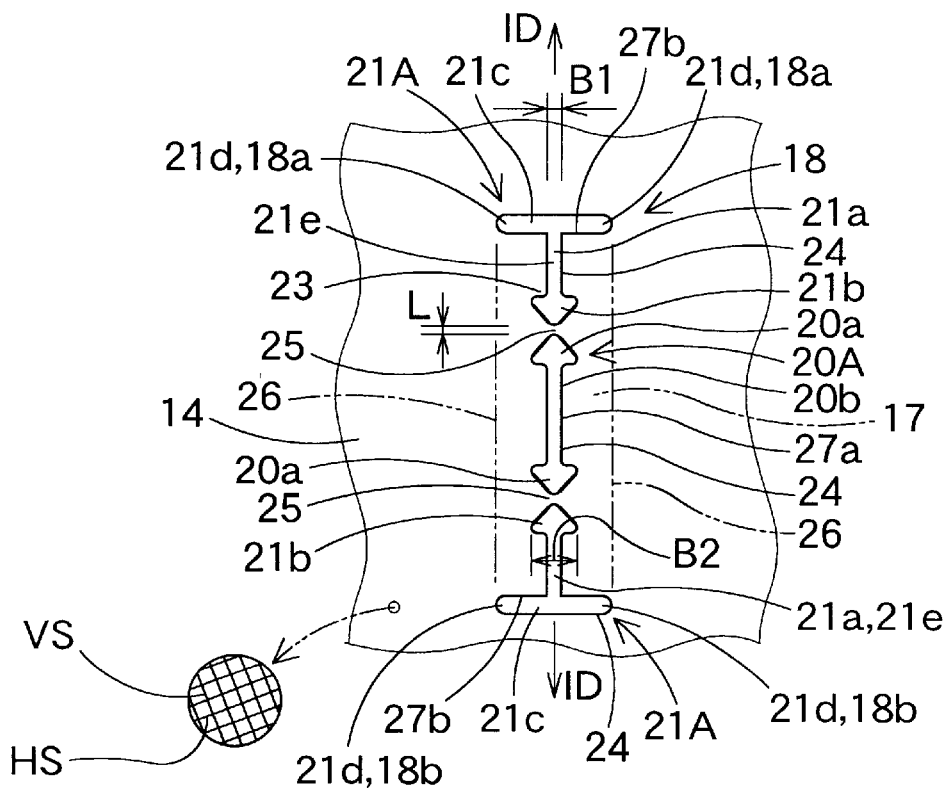
FIG. 22 is a diagram showing a portion f or forming a vent hole of the airbag shown in FIG. 21.
Figure 22:
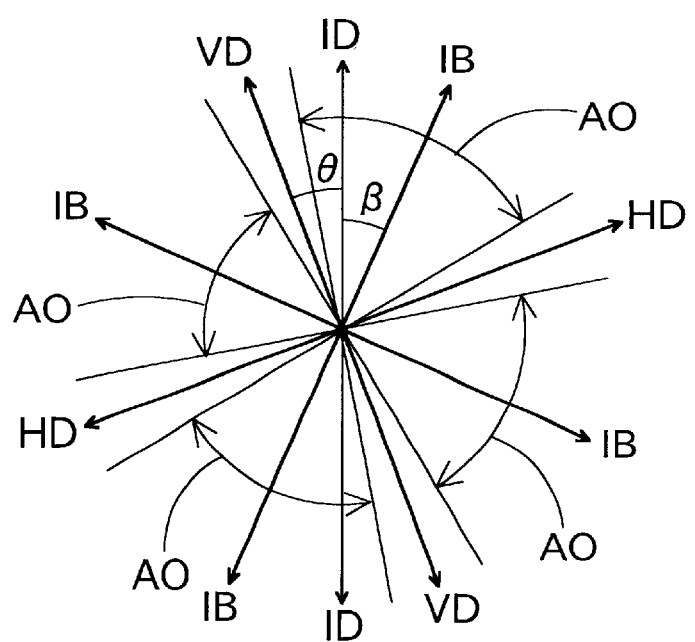

In case the intersection angle θ between the direction ID of the individual slits 20 and 21 of the straight line portion 18d and either the direction of the warps VS or the direction HD of the wefts HS is set at 45 degrees, both the direction ID of the straight line portion 18d and the direction perpendicular to the array direction ID (i.e., the direction of the tensile forces F rupturing portions designed to rupture 25) are right bias directions IB or positive bias directions IB (i.e., the directions at 45 degrees from the directions VD and HD of the warps VS and the wefts HS), in which the woven fabric is most easily extended (as referred to FIG. 22). In case the intersection angle □ is 45 degrees, therefore, the tensile forces F to act on the portions designed to rupture 25 is at a minimum, preventing the portions designed to rupture 25 from prematurely rupturing at the initial expanding stage or the like of the airbag 10. If the direction ID of the straight line portion 18d has the intersection angle θ of just 10 degrees or more with respect to the warps VS or the wefts HS, however, the woven fabric composed of the warps VS and the wefts HS is easily extended. Therefore, the tensile forces F to act on the straight line portion 18d can be reduced to some extent by orienting them generally perpendicular to the direction ID of the straight line portion 18d. As a result, the inclination angle θ between the direction ID of the straight line portion 18d and the direction VD of the warps VS or the direction HD of the wefts HS may be 10 to 45 degrees. Like the array directions ID of the straight line portion 18d shown in FIGS. 21 and 22, therefore, the intersection angle θ from the direction VD of the warps VS may be set to about 21 degrees.

Here, if the range of the intersection angle θ of 10 to 45 degrees refers to the right bias directions IB of the woven fabric, the direction ID is within an angular range A0 of −35 degrees to +35 degrees (as referred to FIG. 22) from the right bias directions IB. In case the intersection angle θ is less than 10 degrees, moreover, the direction ID is within a range from the right bias direction IB to from −35 degrees to −45 degrees or within a range from the right bias direction IB to from +35 degrees to +45 degrees. In case the direction ID comes closer than ±45 degrees to the right bias direction IB, it is oriented along the directions VD or HD of the warps VS or the wefts HS. Therefore, the woven fabric is not easily extended, and the tensile forces from impacts at the initial stage of expansion of the airbag 10 are not reduced.

Here, the airbag 10A shown in FIGS. 21 and 22 is employed in the steering wheel W like the airbag 10. The peripheral wall 11J of the airbag 10A is provided like the peripheral wall 11 with the passenger's side base cloth 13 and the open side base cloth 14, both of which are formed into the disc shape when extended. Moreover, the peripheral wall 11J is formed by sewing the outer circumference edges of the base cloths 13 and 14 to each other. At the center of the open side base cloth 14, there is arranged the gas inlet port 15. Into this gas inlet port 15, there is inserted the gas discharge port 3a of the inflator 3 (see FIG. 5). Around the gas inlet port 15, there are formed a plurality of mounting holes 16. These individual mounting holes 16 are employed when the airbag 10 is mounted in the bag holder 1 (not shown).

In order that the two vent holes 17 may be formed in the open side base cloth 14 itself, moreover, there are formed the two slit groups 18. Each of the slit groups 18 is provided with the straight portion 18d. At the two end portions of each straight line portion 18d, there are arranged trifurcated slits 21A and 21A. These two end slits 21A and 21A are so arranged that the leading ends 21b of the longitudinal openings 21a are directed to each other. Each straight line portion 18d has one straight slit 20A arranged between the trifurcated slits 21A and 21A. Thus, the straight line portion 18d is constructed of the longitudinal openings 21a of the two trifurcated slits 21A and one straight slit 20A. Here, this straight slit 20A is longer than the straight slit 20 of the peripheral wall 11.

Moreover, the two straight line portions 18d are arranged at two transversely symmetric portions with respect to the longitudinal center axis CO extending through the gas inlet port 15 in the open side base cloth 14. Moreover, each straight line portion 18d is so arranged that the directions ID of the individual slits 20A and 21A are oriented radially from the gas inlet port 15 in the open side base cloth 14 and within a range up to 45 degrees from the center axis CO on the front side (i.e., on the front side of the vehicle being steered straight) of the gas inlet port 15.

Each of the straight line portions 18d and 18d of the peripheral wall 11J is arranged on the front side, midway between the gas inlet port 15 to the outer circumference edge of the front side base cloth of the vehicle and is arranged in the directions ID with the angle θ of about 21 degrees both right and left of the center axis CO. Here, the directions VD and HD of the warps VS and the wefts HS of the woven fabric forming the open side base cloth 14 are arranged longitudinally or transversely when the airbag 10 is mounted on the vehicle. Therefore, the intersection angle □ between the array directions ID and the direction VD of the warps VS is also set to about 21 degrees. In other words, the directions ID are set to have an angle □ of 24 degrees from the positive bias directions IB (or the right bias directions IB) of the woven fabric.

In each straight portion 18d, moreover, the end portions 20a and 21b of the individual slits 20A and 21A adjoining the portions designed to rupture 25 are set to have a width B2 of 4 mm, and the general portions 20b and 21e apart from the end portions 20a and 21b are set to have a width B1 of 0.5 mm. In short, the width B2 of the end portions 20a and 21b is made larger than the width B1 of the general portions 20b and 21e. Here, the individual portions designed to rupture 25 have the length L of 2 mm.

In the case of the embodiment, moreover, the individual end portions 20a and 21b are opened generally in a triangular shape pointed toward the portions designed to rupture 25.

The individual slits 20A and 21A are formed at first by melting their peripheral edges with the laser cutter 33 being applied to the base cloth 14. Moreover, the molten peripheral edge is solidified to form the melt-solidified portions 24 at the peripheral edges of the individual slits 20A and 21A in the base cloth 14 thereby to form the slit group 18.

This airbag 10A is manufactured by sewing it and is assembled in the airbag device M and mounted on a vehicle like the airbag 10.

When the inflating gas flows into the airbag 10A, moreover, this airbag 10A expands, and the two portions designed to rupture 25 in each straight line portion 18d rupture. Therefore, the two vent holes 17 are formed to open into a rectangular shape, and the inflating gas is discharged from the two vent holes 17 to suppress the unnecessary rise in the internal pressure of the airbag 10A.

At the time of forming these vent holes 17, the two flap portions 27 and 27 using the longitudinal openings 21a and the straight slits 20A as their leading end edges 27a are opened on the hinge lines 26 and 26. These hinge lines 26 and 26 are the lines joining the leading ends 21d (or the end portions 18a and 18b) of the transverse openings 21c at the two ends of the straight line portion 18d.

Moreover, this airbag 10A can acquire not only actions and effects similar to those of the airbag 10 but also the following actions and effects. Specifically, each vent hole 17 is located on the front side outside of the ring portion R of the steering wheel W, away from the back side of the ring portion R gripped by the driver. As a result, the inflating gas to be discharged from the vent holes 17 can be prevented from touching the hands of the driver directly. Of course, the directions on the open side base cloth 14 radiating from the gas inlet port 15 are the directions for the tensile forces to act on the open side base cloth 14 at the time of extending and expanding the airbag 10A. If the directions ID of the straight line portions 18d are arranged in the radial directions of the open side base cloth 14, therefore, the tensile forces to act in the directions to tear the portions designed to rupture 25 act to the least extent on the portion for forming the vent hole in the course of expansion of the airbag 10A.

In the airbag 10A, moreover, the end portions 20a and 21b of the individual slits 20A and 21A adjoining the portions designed to rupture 25 are made to be width B2 (2 mm), larger than that of the general portions 20b and 21e. Even if the width B1 (0.5 mm) of the general portions 20b and 21e in those slits 20A and 21A is small, therefore, the visual observation of the portions designed to rupture 25 is facilitated. Therefore, the length L of the portions designed to rupture 25 after the slits were formed can be efficiently confirmed.

Moreover, the end portions 20a and 21b of the adjoining slits 20A and 21A are opened in a generally triangular shape pointed toward the portions designed to rupture 25. Specifically, the end portions 20a and 21b are so shaped together with the general portions 20b and 21e as if to point toward the portions designed to rupture 25 with arrows. Therefore, the visual observations of the locations of the portions designed to rupture 25 can be facilitated. As a result, the length L of the portions designed to rupture 25 is confirmed more efficiently. Even if the end portions 20a and 21b are wide, moreover, the stress concentration easily occurs on the side of the portions designed to rupture 25. Therefore, the portions designed to rupture 25 can be properly ruptured.

Here in the peripheral wall 11J of the airbag 10A, the two slit groups 18 are arranged directly in the open side base cloth 14. In the peripheral wall utilizing the applied cloth 29, there may be arranged the same slits groups 18 as those of the peripheral wall 11J.

Figure 23:
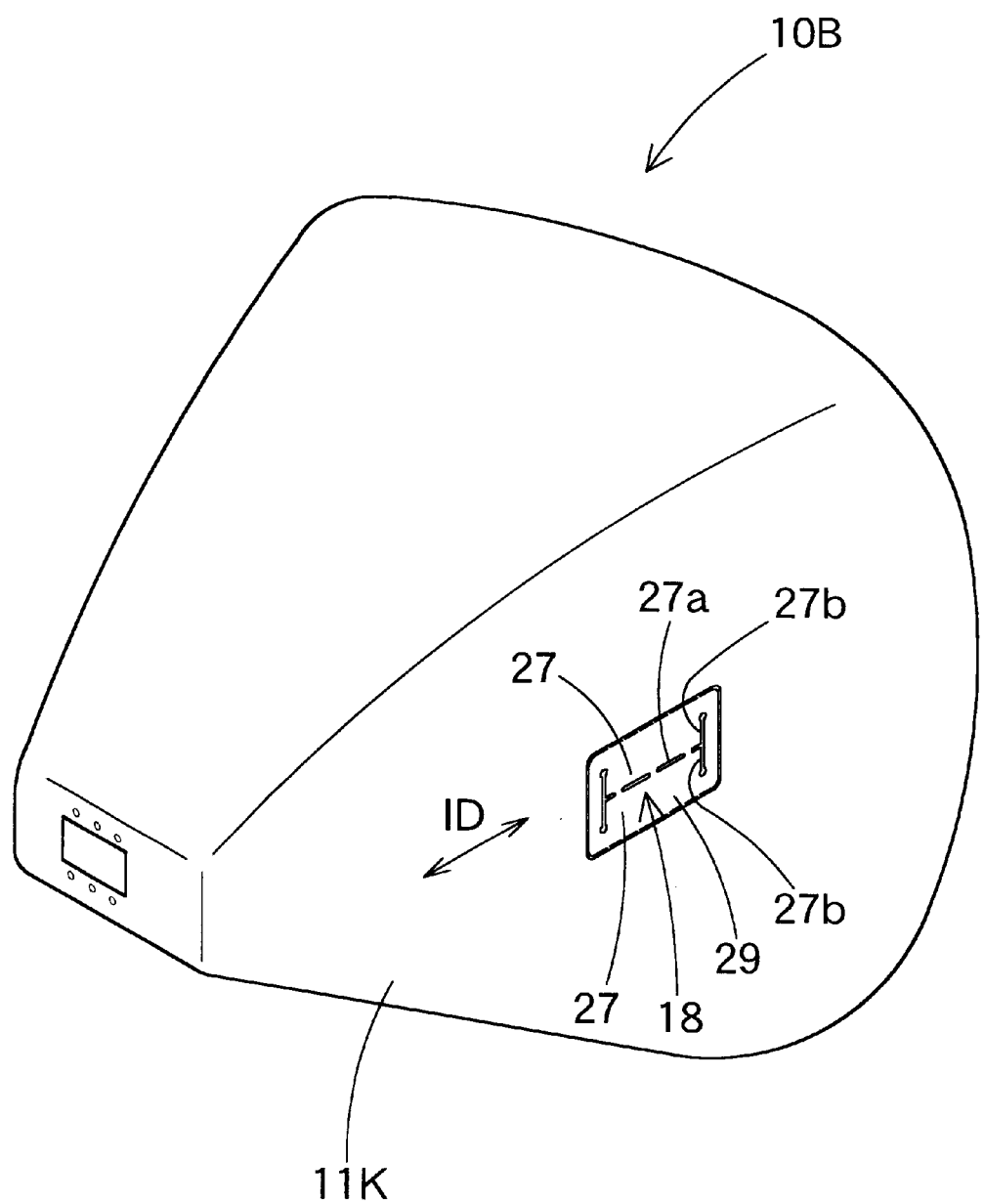
FIG. 23 is a perspective view showing an airbag of a further embodiment.

In the embodiment, moreover, there have been exemplified the airbags 10 and 10A to be employed in the airbag device M for the steering wheel. However, the present invention may be applied to an airbag 10B which is employed in the airbag device or the like for the passenger's seat, as shown in FIG. 23.

Here even in this airbag 10B, the leading end edges 27a of the straight flap portions 27 and 27 are longer than the total length of the side walls 27b of the two flap portions 27. Moreover, the leading end edges 27a are arranged along the directions of the tensile forces acting on the peripheral wall 11K at the time of expansion of the airbag 10B. Here, even in case the straight line slit group 18E shown in FIG. 15 is arranged in the airbag 10B or the like, the directions ID of the slits 19 (20) composing the straight line portion 18d of the slit group 18E are set along the acting directions of the tensile forces to act on the peripheral wall 11K. With this construction, the tensile forces in the directions to tear the portions designed to rupture 25 in the course of expansion of the airbag 10B act very little on the portion for forming the vent hole. Of course, the directions ID of the slits 19 (20) in the slit group 18E may be set in the bias directions with respect to the warps and the wefts.

In the embodiment, there have been described the airbags 10 and 10A which are provided with the peripheral walls 11 and 11J of the woven fabric formed by weaving the melt-solidified warps VS and wefts HS. However, the peripheral walls 11 and 11J need not be formed of the woven fabric, if the melt-solidified portions 24 can be formed around their slits 19. The present invention can be applied even to an airbag which is formed of a synthetic resin sheet, for example.

What is claimed is:

1. An airbag comprising:
    a flexible peripheral wall having a portion which can be melted and resolidified;
    slit group arranged in said peripheral wall and including a plurality of slits arranged intermittently along one line;
    a portion designed to rupture arranged between the slits of said slit group;
    a vent hole defined by said slit group and formed by the rupture of said portion designed to rupture, for discharging an inflating gas; and
    portions of the peripheral edges of said slits formed in said peripheral wall which have been melted and then resolidified.

2. An airbag according to claim 1,
    wherein said peripheral wall includes a main body cloth and an applied cloth having said slit group arranged therein,
    wherein said main body cloth has an arranging hole forming an opening around said slip group, the arranging hole forming a smaller outline than an outline of said applied cloth, and
    wherein said applied cloth is integrated with said main body cloth, with said slit group being surrounded by said arranging hole, by sewing peripheral edges of the applied cloth to peripheral edges of said arranging hole.

3. An airbag according to claim 1,
    wherein said peripheral wall includes a main body cloth and an applied cloth,
    wherein said applied cloth is arranged on said main body cloth at a portion for forming said vent hole, by sewing a peripheral edge of the applied cloth to the main body cloth,
    wherein said slits extend through said applied cloth and said main body cloth, and
    wherein said melted and resolidified portions are formed by melting and resolidifying said applied cloth and said main body cloth such that said cloths are joined to each other.

4. An airbag according to claim 1,
    wherein said slit group is nonlinear,
    wherein a straight hinge line joins two ends of said slit group, and
    wherein a flap portion is defined by said hinge line and said slit group, so that said vent hole is formed when said flap portion is opened about said hinge line.

5. An airbag according to claim 4,
    wherein said slits extend radially from a corner portion of said slit group.

6. An airbag according to claim 4,
wherein said slit group is H-shaped and defines another hinge line and another flap portion, the flap portions opening to form said vent hole when the internal pressure of the airbag rises.

7. An airbag according to claim 6,
wherein said slit group has a straight line portion, and trifurcated slits having a T-shape are arranged at the ends of said straight line portion such that longitudinal openings of the trifurcated slits have end portions that are directed toward each other.

8. An airbag according to claim 7,
wherein said straight line portion has at least one straight slit arranged between said trifurcated slits.

9. An airbag according to claim 1,
wherein said slit group includes a straight line portion having a plurality of slits arranged in a straight line, and
wherein said straight line portion is perpendicular to respective directions of tensile forces acting on said peripheral wall adjacent to said slit group when the inflating gas flows into the airbag before the formation of said vent hole.

10. An airbag according to claim 1,
wherein said peripheral wall is made of a woven fabric having yarns extending in warp and weft directions, said yarns capable of being melted and resolidified,
wherein said slit group has a straight line portion in which a plurality of slits are arranged in a straight line, and
wherein each of said slits in said straight line portion extends in a bias direction which intersects both the warp and weft directions.

11. An airbag according to claim 10,
wherein said bias direction intersects said warp and weft directions at an angle of 10 to 45 degrees.

12. An airbag according to claim 10,
wherein said peripheral wall is formed for a steering wheel by sewing outer peripheral edges of a circular steering wheel side base cloth and a circular passenger's side base cloth to each other,
wherein said steering wheel side base cloth has a gas inlet port opened at its center for introducing the inflating gas and portions for forming said vent hole and an additional vent hole having an additional straight line portion with a plurality of slits,
wherein said straight line portions are arranged at two transversely symmetric portions on either side of a longitudinal center axis extending through said gas inlet port in said steering wheel side base cloth, and
wherein said straight line portions are individually arranged such that said slits extend radially from said gas inlet port in said steering wheel base cloth and at an angle of no more than 45 degrees with respect to said longitudinal center axis.

13. A method for making a vent in an airbag, the airbag comprising: a flexible peripheral wall having a portion capable of being melted and resolidified; a slit group arranged in said peripheral wall and including a plurality of slits arranged intermittently along one line; a portion designed to rupture arranged between the slits of said slit group; and a vent hole defined by said slit group and formed by the rupture of said portion designed to rupture, for discharging an inflating gas, the method comprising:

forming said slits in said peripheral wall, peripheral edges of said slits being melted at the time of forming said slits; and resolidifying said molten peripheral edges after said slits are formed, to form resolidified portions at the peripheral edges of said slits in said peripheral wall thereby to form said slit group.

14. A method according to claim 13,
wherein end portions of the slits adjoining the portion designed to rupture are made wider than the portions of said slits apart from said end portions.

\* \* \* \* \*